United States Patent
DiGiantomasso et al.

(10) Patent No.: US 10,715,713 B2
(45) Date of Patent: Jul. 14, 2020

(54) INTERACTIVE APPLICATION ADAPTED FOR USE BY MULTIPLE USERS VIA A DISTRIBUTED COMPUTER-BASED SYSTEM

(71) Applicant: Breakthrough PerformanceTech, LLC, Los Angeles, CA (US)

(72) Inventors: John DiGiantomasso, Rancho Santa Margarita, CA (US); Martin L. Cohen, Malibu, CA (US)

(73) Assignee: Breakthrough PerformanceTech, LLC, Los Angeles, CA (US)

( * ) Notice: Subject to any disclaimer, the term of this patent is extended or adjusted under 35 U.S.C. 154(b) by 0 days.

(21) Appl. No.: 16/392,928

(22) Filed: Apr. 24, 2019

(65) Prior Publication Data
US 2019/0335083 A1 Oct. 31, 2019

Related U.S. Application Data

(60) Provisional application No. 62/664,819, filed on Apr. 30, 2018.

(51) Int. Cl.
| | |
|---|---|
| *H04N 5/232* | (2006.01) |
| *G06F 3/01* | (2006.01) |
| *G09B 5/00* | (2006.01) |
| *G06F 16/954* | (2019.01) |
| *G06Q 10/06* | (2012.01) |
| *G06Q 10/10* | (2012.01) |

(52) U.S. Cl.
CPC ......... *H04N 5/23203* (2013.01); *G06F 3/017* (2013.01); *H04N 5/23219* (2013.01); *H04N 5/232933* (2018.08)

(58) Field of Classification Search
USPC ......................................... 386/230, 239–248
See application file for complete search history.

(56) References Cited

U.S. PATENT DOCUMENTS

| | | | |
|---|---|---|---|
| 8,068,780 B2 | 11/2011 | Cohen | |
| 8,565,668 B2 | 10/2013 | Cohen | |
| 8,571,463 B2 | 10/2013 | Cohen et al. | |
| 8,597,031 B2 | 12/2013 | Cohen et al. | |
| 8,602,794 B2 | 12/2013 | Cohen | |

(Continued)

OTHER PUBLICATIONS

International Search Report and Written Opinion received in International Patent Application No. PCT/US2019/028897, dated Oct. 4, 2019.

*Primary Examiner* — Hung Q Dang
(74) *Attorney, Agent, or Firm* — Knobbe, Martens, Olson & Bear LLP

(57) ABSTRACT

A processing device causes a selection of a multimedia module to be detected. The processing device renders, during a first mode of operation, a dynamic navigation flow control in association with first multimedia content of the multimedia module, wherein the rendered dynamic navigation flow control indicates a first navigation position. The processing device stores a first result to memory obtained by execution of an interactive event during the first mode of operation. Based at least on the first result, a second mode of operation is entered. During the second mode of operation, the dynamic navigation flow control is re-rendered in association with second multimedia content of the multimedia module, wherein the re-rendered dynamic navigation flow control indicates a second navigation position.

30 Claims, 24 Drawing Sheets

(56) References Cited

U.S. PATENT DOCUMENTS

| | | |
|---|---|---|
| 8,696,364 B2 | 4/2014 | Cohen |
| 8,702,432 B2 | 4/2014 | Cohen |
| 8,702,433 B2 | 4/2014 | Cohen |
| 8,714,987 B2 | 5/2014 | Cohen |
| 8,887,047 B2 | 11/2014 | DiGiantomasso et al. |
| 9,495,882 B2 | 11/2016 | Cohen et al. |
| 9,633,572 B2 | 4/2017 | Cohen et al. |
| 9,679,495 B2 | 6/2017 | Cohen |
| 9,728,096 B2 | 8/2017 | DiGiantomasso et al. |
| 10,102,762 B2 | 10/2018 | DiGiantomasso et al. |
| 10,127,831 B2 | 11/2018 | Cohen et al. |
| 10,152,897 B2 | 12/2018 | Cohen et al. |
| 2003/0211447 A1 | 11/2003 | Diesel et al. |
| 2007/0055520 A1* | 3/2007 | Mowatt .................. G09B 5/04 704/251 |
| 2010/0005413 A1 | 1/2010 | Liang et al. |
| 2012/0036455 A1 | 2/2012 | Holt et al. |
| 2014/0147824 A1 | 5/2014 | Kumar T. |
| 2014/0289657 A1 | 9/2014 | Beskrovny et al. |
| 2015/0177964 A1* | 6/2015 | Spirer ................ G06F 16/4393 715/732 |
| 2017/0068380 A1* | 3/2017 | Hong ................... G06F 3/0482 |

\* cited by examiner

INTERACTIVE APPLICATION ADAPTED FOR USE BY MULTIPLE USERS VIA A DISTRIBUTED COMPUTER-BASED SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This document relates to systems and techniques for rendering content and to content navigation tools.

Description of the Related Art

Conventional interactive systems exist. However, such conventional systems do not adequately provide dynamic interactivity with users. Further, accessing content in such conventional systems is often a cumbersome, confusing process.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a system, comprising: a processing device; a computer readable medium that stores programmatic instructions that, when executed by the processing device, are configured to cause the system to perform operations comprising: detect a selection of a multimedia module; render, during a first mode of operation, a dynamic navigation flow control in association with first multimedia content of the multimedia module, wherein the rendered dynamic navigation flow control indicates a first current navigation position; store a first result to memory obtained by execution of an interactive event during the first mode of operation; based at least on the first result, enter a second mode of operation; and re-render, during the second mode of operation, the dynamic navigation flow control in association with second multimedia content of the multimedia module, wherein the re-rendered dynamic navigation flow control indicates a second navigation position corresponding to a second current navigation position.

An aspect of the present disclosure relates to a non-transitory computer readable medium that stores programmatic instructions that, when executed by a processing device, are configured to cause the processing device to perform operations comprising: detect a selection of a multimedia module via a user input device; enable, during a first mode of operation, a dynamic navigation flow control to be rendered in association with first multimedia content of the multimedia module, wherein the rendered dynamic navigation flow control indicates a first current navigation position; enable a first result to stored memory obtained by execution of an interactive event during the first mode of operation; enable a second mode of operation to be entered based at least in part on the first result; and enable the dynamic navigation flow control to be re-rendered, during the second mode of operation, in association with second multimedia content of the multimedia module, wherein the re-rendered dynamic navigation flow control indicates a second navigation position corresponding to a second current navigation position.

An aspect of the present disclosure relates to a computer implemented method, the method comprising: detecting, using a computerized system, a selection of a multimedia module, wherein the select is made via a user input device; using the computerized system, enabling during a first mode of operation, a dynamic navigation flow control to be rendered in association with first multimedia content of the multimedia module, wherein the rendered dynamic navigation flow control indicates a first current navigation position; using the computerized system, enabling a first result to stored memory obtained by execution of an interactive event during the first mode of operation; using the computerized system, enabling a second mode of operation to be entered based at least in part on the first result; and using the computerized system, enabling the dynamic navigation flow control to be re-rendered, during the second mode of operation, in association with second multimedia content of the multimedia module, wherein the re-rendered dynamic navigation flow control indicates a second navigation position corresponding to a second current navigation position.

BRIEF DESCRIPTION OF THE DRAWINGS

Embodiments will now be described with reference to the drawings summarized below. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
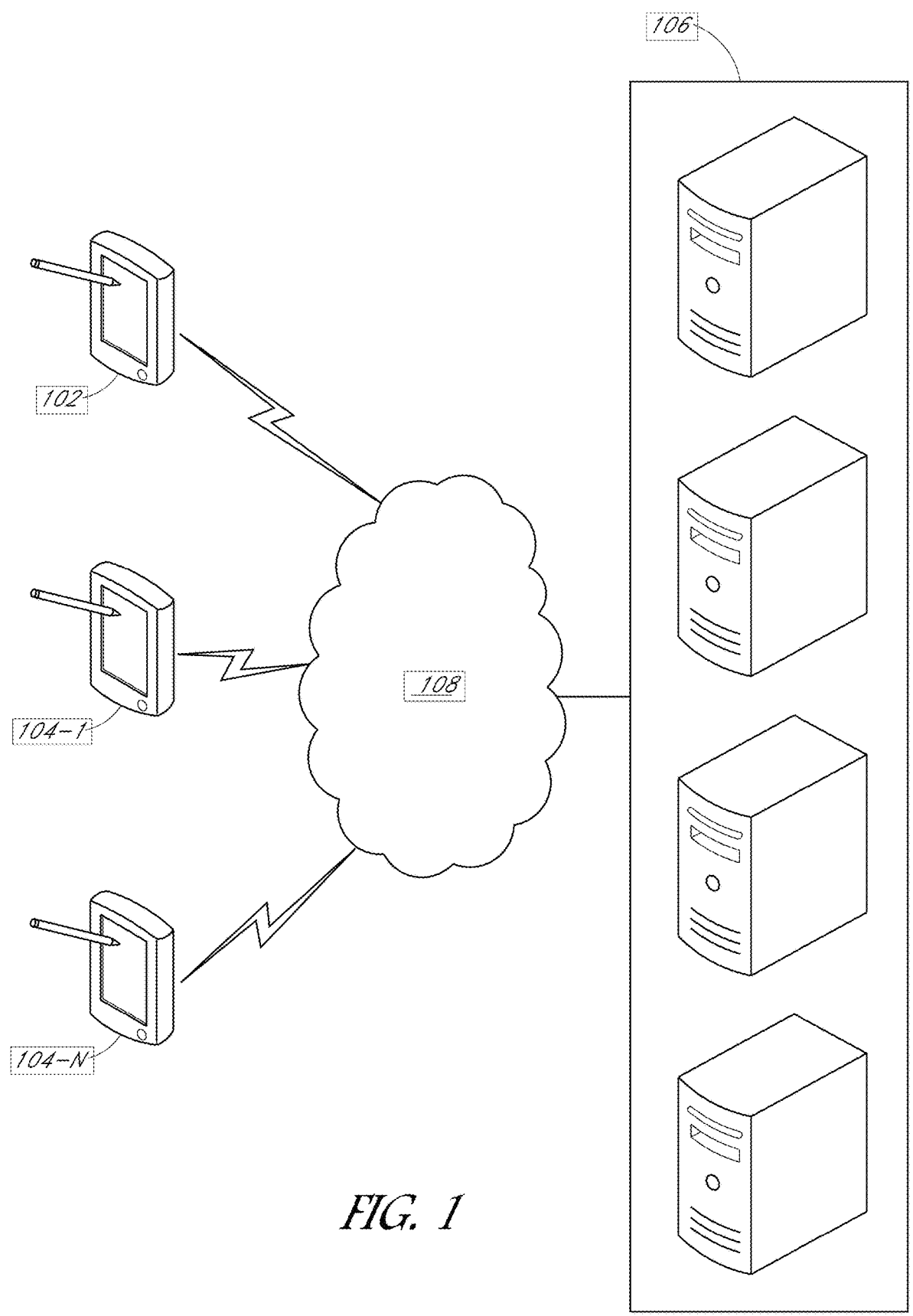
FIG. 1 illustrates an example architecture.

The task of navigating within an interactive content module (e.g., an interactive training module), having a large number of related video, audio, and text content components and subcomponents, to locate content of interest can be burdensome and time consuming for users. This may especially be the case if the users do not know the structure of the content module or the names of the content module components and subcomponents. Further, in many cases, the content components and subcomponents are not accurately or intuitively categorized, requiring the user to perform additional navigation or keyword searching. Thus, conventionally the user frequently has to perform numerous navigational steps to arrive at the content (e.g., learning or training content) of interest.

Because certain example improved user interfaces and their structures disclosed herein are optimized for navigation of and interaction with related items of video, audio, and text content for computing devices, it makes it easier for a user to more accurately provide instructions and interact with content as compared to conventional user interfaces, thereby reducing user input errors, and making content access quicker. In addition, a dynamic navigation flow user interface is optionally rendered that visually depicts an interactive content flow, the current position of the navigation flow, and alternative content navigation paths. Such a dynamic navigation flow user interface further facilitates accurate and quick navigation through a complex interactive content flow. By contrast, many conventional user interfaces tend to provide non-intuitive and cumbersome interfaces, making it difficult for the user to locate and select a correct item of content. Further, conventional user interfaces do not provide a dynamic navigation flow user interface, leading to confusion and erroneous content selection, wasting system resources and network bandwidth. Still further, certain conventional systems, such as conventional training systems, require that content be linearly accessed and viewed or make it difficult to access content in accordance with a user's learning style.

Thus, as would be appreciated by one of skill in the art, the use of the disclosed navigation techniques and user interfaces represent a significant technological advance over prior conventional implementations. For example, the use of the dynamic navigation flow user interface enables a user to locate and access content, such as training module components and subcomponents, with fewer clicks, scrolls, and/or page (or other display combination) navigations that would otherwise be required to assess locate appropriate content.

Further, certain disclosed user interfaces enable users to visually locate module content components and subcomponents more quickly than with current conventional user interfaces. For example, in the embodiments described herein, when a user is presented with a dynamic navigation flow user interface including identifiers for module components and subcomponents, each identifier includes, or is in the form of, a link to the corresponding component or subcomponent content, allowing the user to navigate directly to the corresponding content. Each dynamic navigation flow user interface entry thus serves as a programmatically selected navigational shortcut to the corresponding content, allowing the user to bypass searching for the content or having to navigate through multiple pages (or other display combinations) of user interfaces to the content. This can be particularly beneficial for computing devices with small screens, where fewer items can be displayed to the user at a time and thus navigation of larger volumes of items is more difficult.

Another benefit of the disclosed dynamic navigation flow user interface is that it is dynamically updated to provide progress information as the user navigates from one item of content to another, so the user is aware of where in a module of related content the user is. The user would otherwise typically have to toggle between different pages/display combination to determine how far into a module (e.g., an interactive learning module), the user is.

Still further, certain example user interfaces disclosed herein are optimized for relatively small, touch-screen devices, thereby facilitating access and navigation of content on smart phones, tablets, and the like. Yet further, certain embodiments render a scene using animated content from multiple perspectives, providing a more immersive viewing and interaction experience.

In addition, certain user interfaces described herein may include a complex assortment of swappable content. For example, as will be described, the user may be enabled to swap information presented in a user interface panel from text data, to graphic data, to video data. Advantageously, so that such swapping occurs virtually instantaneously, the entire display combination (.e.g., page) may be loaded together to a user system (including multiple items of swappable data for a given panel). Optionally, the user interfaces may be defined using HTML (e.g., HTML5), loaded onto a user browser, and may be then rendered using the browser.

Optionally, there may be one or more predefined flows. Optionally, the user is enabled to divert from the predefined flow to create a custom flow. For example, where the navigation flow user interface is for a training flow, a predefined flow may include some or all of the following states: challenge, observe, focus, practice, review. By way of further example, a predefined flow may be shorter or longer. For example, where the navigation flow user interface is for a training flow, a predefined flow may include the following states: challenge, observe, and practice.

As such, the embodiments described herein represent significant improvements in computer-related technology.

FIG. 1 illustrates an example architecture. A system 106 (which may be a cloud-based system comprising one or more servers that are co-located and/or that are geographically dispersed) may host one or more applications that when executed cause a variety of the processes described herein to execute. For example, with reference to FIG. 2B, the system 106 may include an operating system 208B, an animation engine 206B to generate the animation disclosed herein, a navigation engine 204B to generate the navigation interfaces and to respond to navigational inputs, and/or a performance measurement engine 202 to measure performance (e.g., calculate based on user inputs one or more performance scores, as described in greater detail herein).

Optionally, the cloud system 106 may include one or more Apache Hadoop clusters, optionally including a Hadoop distributed file system (HDFS) and a Hadoop MapReduce parallel processing framework. The system 106 may be configured to process and store large amounts of data that would not be effectively by conventional system. The system 106 may be configured to process and store large amounts of structured data, unstructured data, and/or semi-structured data. The data may comprise user or training-related data (including sound and/or image (e.g., still or video) recordings, animation files, performance data, calendaring information, facilitator data, etc.). The clusters may comprise master nodes (e.g., a name node, a job tracker, etc.), and slave nodes (e.g., data nodes, task trackers, etc.). A given data node serves data over a network using the distributed file system (e.g., HDFS) protocol. The file system may utilize a TCP/IP layer for communication. The distributed file system may store large files across multiple data node machines and may store copies of data on multiple hosts to enhance reliability and data availability.

With respect to the optional Hadoop implementation, other systems may submit tasks to the job tracker, which in turn, distributes the tasks to available task tracker nodes. Optionally, the job tracker may attempt to distribute a given task to a node in geographic proximity to the needed data. While the foregoing example refers to Hadoop clusters and related components, other distributed platforms may optionally be used in addition or instead to process and store data, such as large amounts of data including structured, unstructured, and/or semi-structured data, (e.g., distributed platforms utilizing Bashreduce, Qizmt, Spark, Disco Project, etc.).

The system 106 may communicate over one or more wired and/or wireless local and/or wide area networks (e.g., the Internet) 108 with one or more user terminals, such as one or more optional facilitator terminals 102 and one more subject (e.g., trainee) terminals 104-1 . . . 104-N. A given terminal may optionally be a wireless mobile device (e.g., a smart phone, tablet, laptop, wearable, virtual reality headset, augmented reality headset, or the like), although a terminal may be connected to a network via a wired interface. Optionally, some or all of the processes described herein may be performed using a dedicated application (an app) download to and hosted by a user terminal 104 or facilitator terminal 106.

Figure 2A:
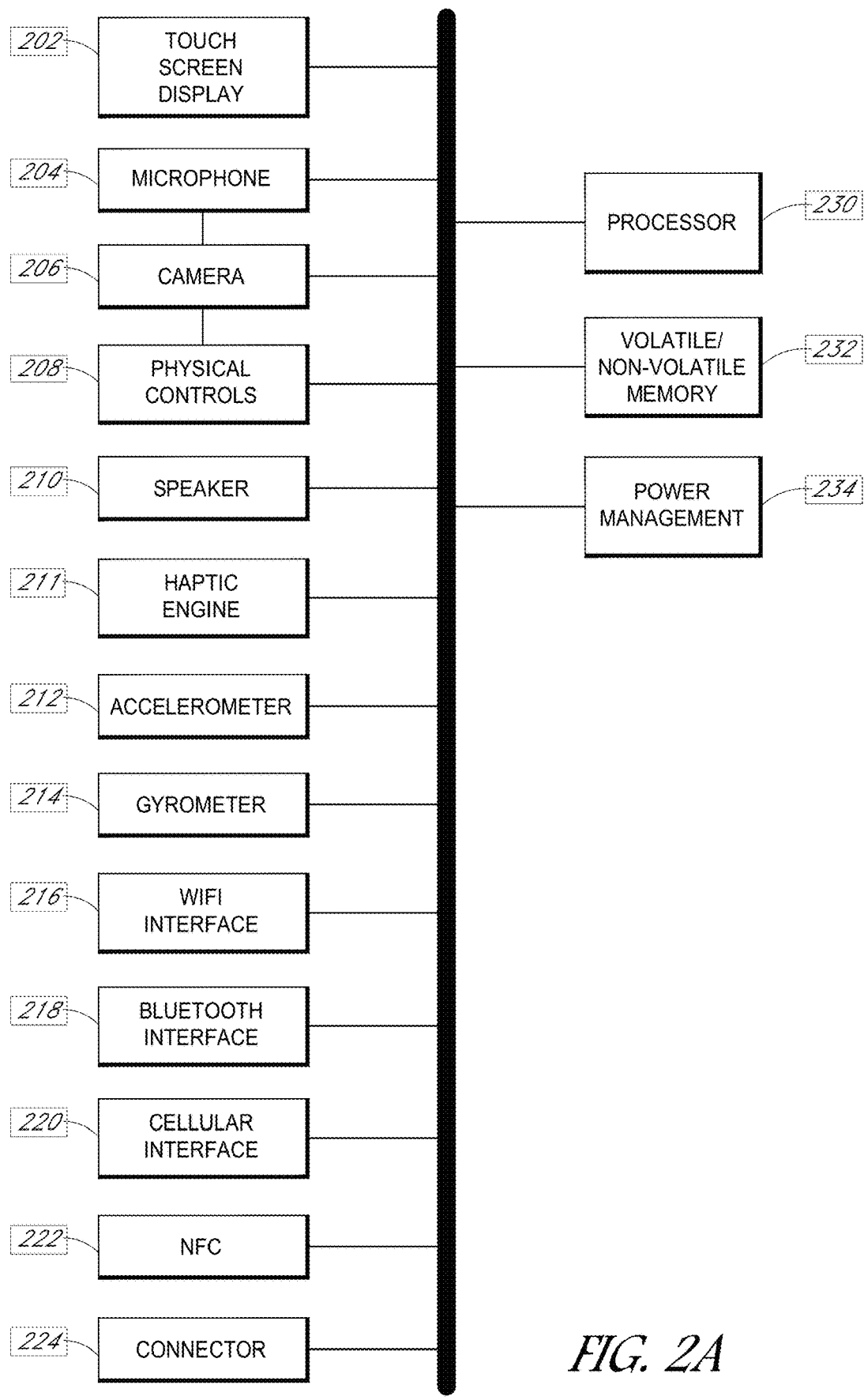
FIG. 2A illustrates an example hardware architecture.
Figure 2B:
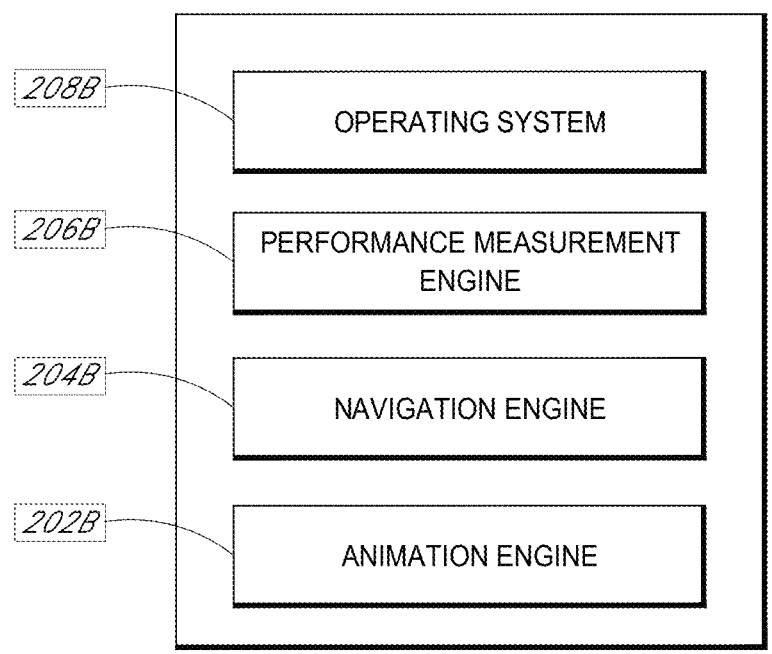
FIG. 2B illustrates an example software architecture

FIG. 2A illustrates an example user terminal 200 in the form of a tablet, phone, laptop, or appliance. In the example illustrated in FIG. 2a, the user terminal 200 includes various user input/output devices, such as a touchscreen/display 202, a microphone 204, a camera 206, physical controls 208 (e.g., a power on/off control, a volume control, a home control, etc.), a speaker 210, and/or other user input/output devices. The user terminal 200 may optionally include a haptic engine 211 that provides kinesthetic communication to the user (e.g., via vibrations or taps, which may be used to confirm a user input or to provide a notification), an accelerometer 212 that measures acceleration in 2-3 directions, and/or a gyrometer (e.g., a 3-axis gyroscope) 214 that measures orientation in three axis. The user terminal 200 may be equipped with an external or integral physical keyboard, trackpad, joystick, electronic pen, and/or other input device.

The user terminal 200 may include one or more wireless and/or wired interfaces. For example, the user terminal 200 may include a WiFi interface 216, a Bluetooth interface 218, a cellular interface 220, an NFC (near field communication) interface 222, and/or one or more physical connectors 224 (e.g., a USB connector, a LIGHTING connector, and/or other connector). The user terminal 200 further comprises a processor device (e.g., a microprocessor) 230, volatile memory (e.g., RAM solid state memory) and non-volatile memory (e.g., FLASH memory), and a power management device 234.

An application (e.g., a training application) may be utilized to transmit audible voice input received from a user (e.g., a trainee) via the microphone 204 and digitized using an analog-to-digital converter and video content captured via the camera 206 over a network to the system 106. The audio and video content may be stored locally on the user terminal and/or on the system 106 for later access and playback.

User inputs (e.g., commands and/or data) may also be received by the user terminal 104 via a keyboard, a stylus, via voice entry (provided via the microphone 204) which may be converted to text via a voice-to-text module, or via pupil movement captured by the camera 206. The keyboard and/or stylus may be included with the user terminal 200.

The user terminals may include a variety of sensors (e.g., sound, image, orientation, pressure, touch, mouse, light, acceleration, pupil trackers, and/or other sensors) configured to detect user input and interaction with the user terminals. The user terminals may optionally include touch screens configured to display user interfaces and data and receive user input via touch. The user terminals may include physical keyboards. The user terminals may utilize one or more microphones 204 to receive voice data and/or commands, and one or more speakers 210 to play audible content. The user terminals may utilize the camera 206 to capture, record, and/or stream video (and/or still image) data (which may be stored or streamed in association with captured audio data) to other systems, such as the system 106. For example, the camera 206 may be a front facing camera of a phone, a PC/laptop webcam, or other image capture device. A given user terminal may include or be configured with media players that enable the user terminal to play video and/or audio content, and display still images.

The user terminals may be associated with various user-types, such as facilitators and trainees (sometimes referred to herein as "subjects").

Data transmitted or received by the user terminal 200 or system 106 may be secured by establishing a virtual private network (VPN) which establishes an encrypted transmission path between the user terminal and system 106. Optionally, Secure Sockets Layer (SSL), a secure transfer tunnel, may be used to encrypt data in transit between the user terminal (e.g., a training app and/or browser) and the system 106. Optionally, some or all of the information may be stored on the user terminal and/or the system 106 using file encryption. Optionally, the encryption key may be stored physically separate from the data being encrypted (e.g., on different physical servers).

The system 106 may be configured to generate and supply user interfaces at different resolutions (e.g., HD (1920 by 1080 pixels), 4K (3084 by 2160 pixels), 8K (7680×4320 pixels), or even higher or lower resolutions).

As discussed above, FIG. 2B illustrates an example software architecture including an operating system (e.g., MICROSOFT WINDOWS, APPLE OSX, APPLE IOS, GOOGLE ANDROID, GOOGLE CHROME, UNIX, LINUX, UBUNTU, etc.). An animation engine generates 202B animations illustrated in the user interfaces discussed herein and illustrated in the figures. The animations used in the user interfaces disclosed herein may synchronize animated characters' movements and facial expressions, lip motions, hand and other limb gestures, other body parts, and/or clothing with the characters' speech and sounds.

Optionally, animation content may be generated using motion capture of an actor's lips, mouth, eyes, arms, hands, legs, torso, and other body parts is performed while recording the actor's voice. A skeletal model of the actor's lips, mouth, eyes, arms, hands, legs, torso, and other body parts may be generated to capture the exact animation. Thus, animation of characters may be provided that conveys and simulates human emotions, such as happiness, fear, inquisitiveness, sadness, anger, aggression, and the like.

Optionally, in addition to or instead of utilizing motion capture, a user may define key frames via an animation user interface, and specify the location of various body components, such as lips, mouth, eyes, arms, hands, legs, torso, other body parts, clothes, and the like. The differences in body component positions may be calculated, and intermediate positions may be interpolated and corresponding frames may be generated. Optionally, tweening or morphing may be utilized. For example, the following tweening equation may be utilized for tweening via linear interpolation:

$$P=A(1-t)+Bt \quad 0 \leq t \leq 1$$

Where A is the initial location of the point, B is the final position of the point, and t is the time from 0 to 1.

The animation may then be rendered.

Certain example user interfaces related to interactive content will now be described. In this example, the interactive content is intended to train a subject in how to respond in certain situations as a police officer. In particular, a police officer is depicted in an interaction with a civilian. It is understood that the interactive content may be directed to different training scenarios. As will be described, an example content module may include briefing, practice, debriefing, evaluation, and summary modes. Techniques for reinforcing skills are described.

A content module may be selected from a library of content modules via a content library user interface. The content library user interface may list content modules a subject/user is authorized to access, where a given library entry may include the name of the module, a brief description of the module that indicates the types of interactions the user will be expected to make (e.g., "While on routine patrol, you receive a radio call for a suspicious male adult following female shoppers and making them uncomfortable. The business owner has requested that the subject leave several times, but he has refused to do so. The owner has requested you remove the subject. You must explain the situation to the shopper and escort him from the premises."). Optionally, a snapshot/screenshot image of the scene may be provided for display via the content library user interface to provide a visual indication as to the module content or subject matter. Optionally, in addition or instead, video clips (e.g., trailer videos) may be provided for playback that provide an overview of the module content or subject matter.

Figure 3A:
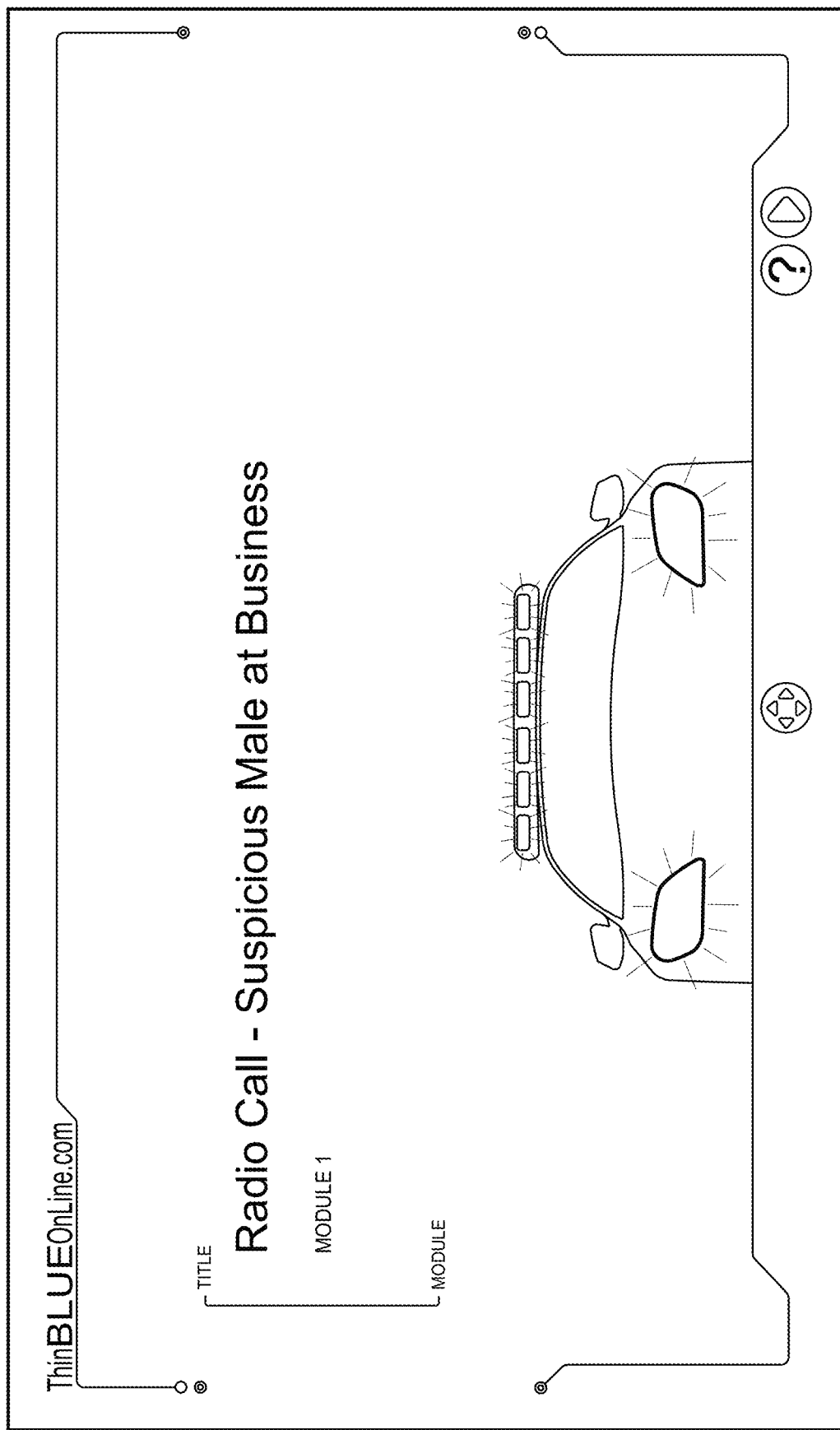
FIGS. 3A-3M illustrates example user interfaces.

FIG. 3A illustrates an example content user interface. The example user interface comprises a content name field ("radio call-suspicious male at business") and a module identifier ("module 1") that may be indicative of where in a sequence of content items that content about to be presented is positioned. In this example, the module may comprise text, video, and audio content utilized to train personnel in how to interact with a suspicious male at a business, where a business operator accessed a communication system to report such a suspicious male.

Figure 3B:
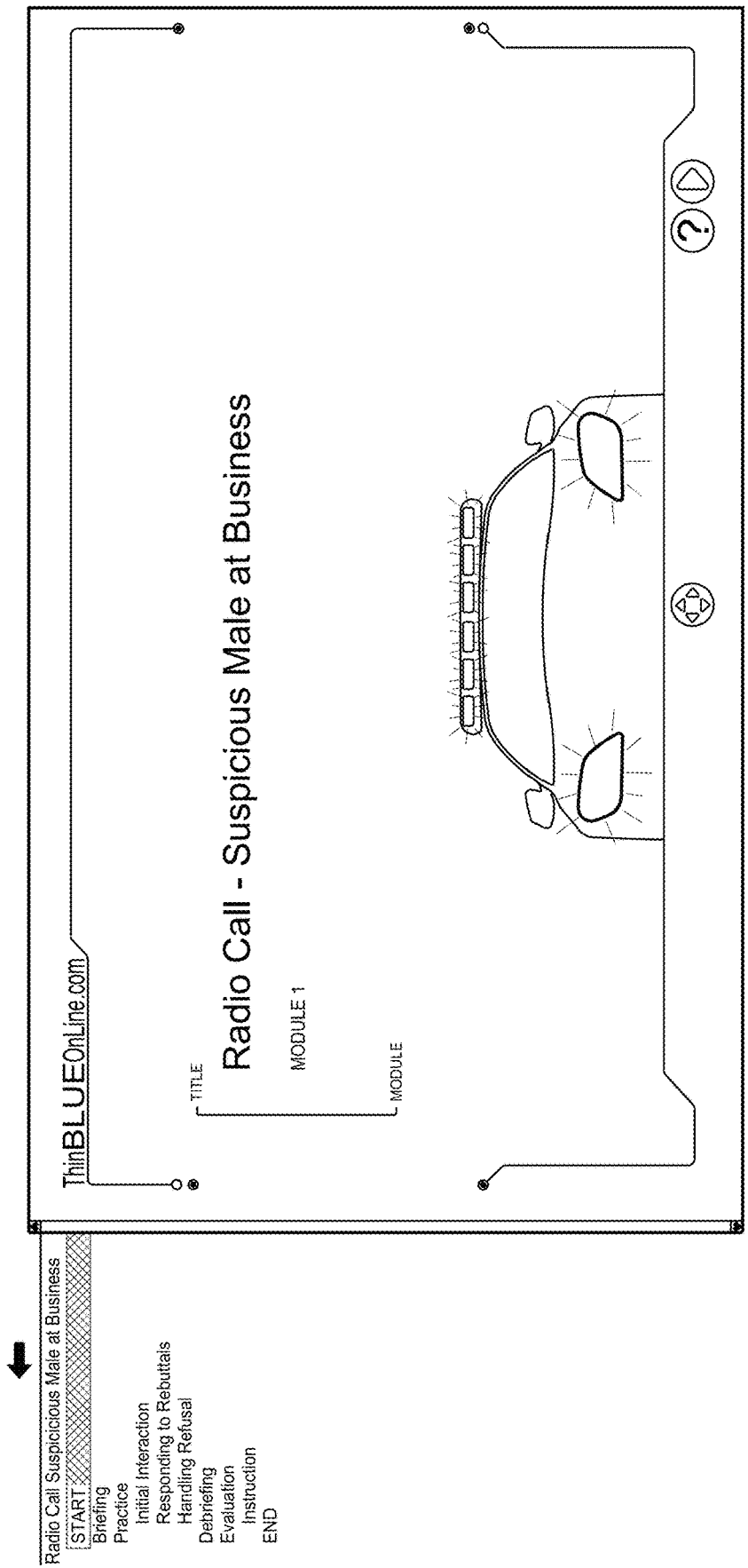

In response to a user selecting the navigation icon at the bottom, middle of the example user interface, a direct navigation interface (e.g., a navigation sidebar or other navigation control) may be generated and rendered, such as that illustrated in FIG. 3B. The direct navigation interface provides various entries including components and subcomponents of the interactive module. A user can directly navigate to a desired component or subcomponent by activating (e.g., clicking on, touching, hovering over using a pointing device, staring at, etc.) a given entry. Optionally, the direct navigation interface renders entries hierarchically, wherein module components may be initially listed, and in response to a user activating a given component, the listing expands to show the given component's subcomponents, indented relative to the parent component. In response to the user activating the given component again, the list will be collapsed so that the subcomponents are not displayed. Such a hierarchical interface provides a space efficient and easy to navigate tool.

Figure 3C:
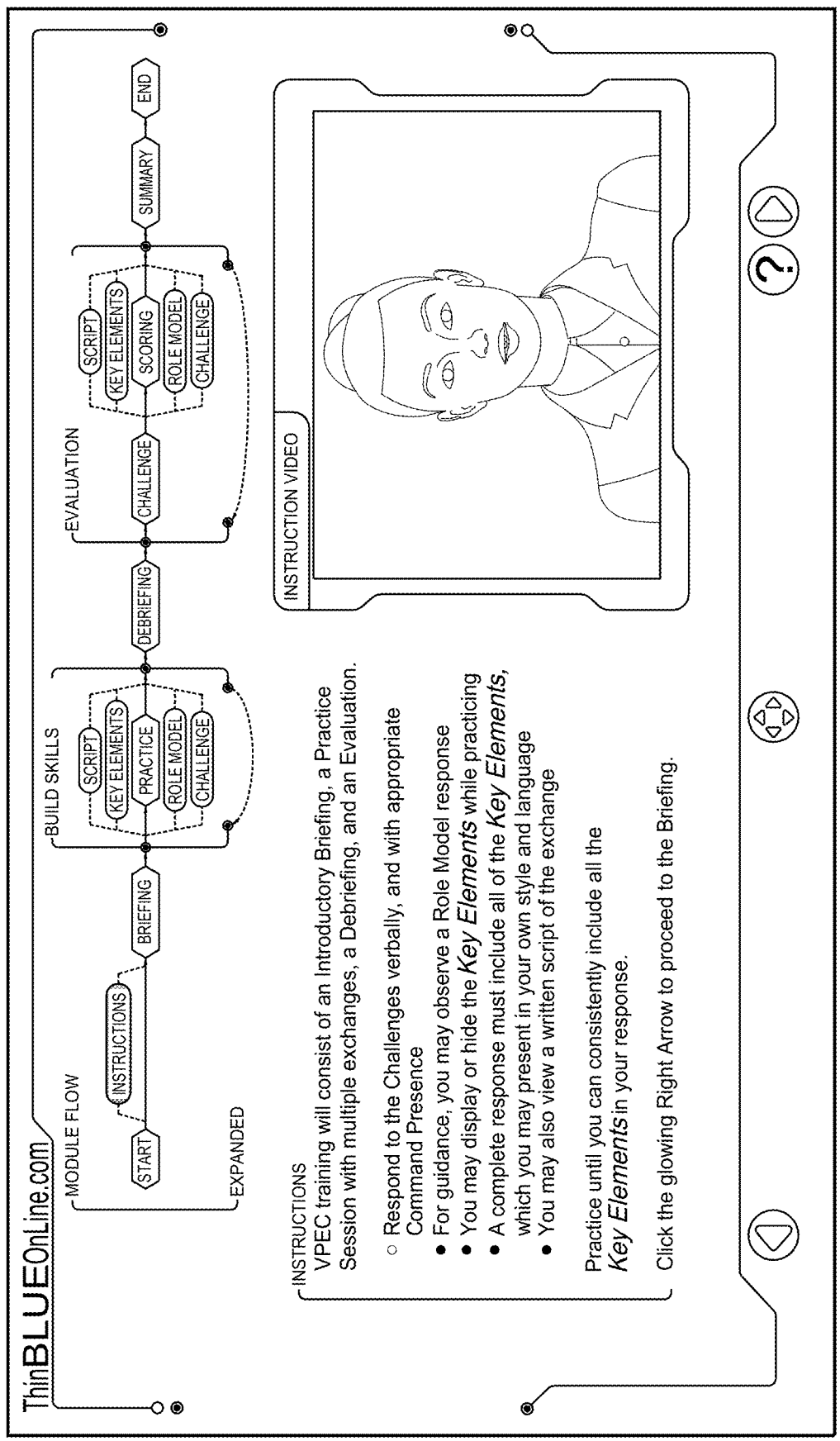

In response to the user activating a "?" question mark help icon, a help information user interface is displayed, such as that example user interface illustrated in FIG. 3C. The user interface comprises a dynamic navigation flow user interface corresponding to the selected module. In this example, the dynamic navigation flow user interface may be rendered in an expanded mode, depicting all or substantially all the components and subcomponents of the module. The example rendered dynamic navigation flow user interface includes a start component, a briefing component, a practice ("skills building") component, an instructions component, a debriefing component, an evaluation component, a summary component, and end component. Other example components may be included. For example, an "Insights" component may be included that provides background considerations and concepts relevant to a scene. For example, optionally the insights component may not include the spoken dialogue, but may include concerns, theories, advice, or strategies for the user to consider.

The navigation user interface may be dynamically rendered to indicate (e.g., via highlighting, color, animation, or otherwise) which content component is currently being rendered to the user to advantageously indicate where in the module training process the user is. In this example, the instructions component is emphasized (e.g., highlighted), to indicate the user is accessing the instruction content. The component names may be indicated by rendering the component name using a different form of emphasis (e.g., by rendering the component name in a specific type of geometric shape, such as a six-sided polygon, using a different color, using a different font, underlining, and/or otherwise). Certain components may also be rendered with descriptive text (e.g., "build skills"). Optionally, components displayed in the user interface may also serve as navigation shortcuts to other areas of the module.

In this example, the practice ("skills building") component of the dynamic navigation flow user interface is expanded to show subcomponents, including script, key elements, role model, and challenge components. Other components or sets of components may be included. As will be described greater detail herein, the script subcomponent renders the script for one or more videos in a set of videos. For example, where there is video set including multiple videos of the same scene including multiple speakers in a verbal exchange, where a given video is from the perspective of the current speaker, the script optionally includes the speech for each speaker in the set, including an identifier (e.g., title, name, etc.) associated with the speaker. The challenge subcomponent comprises a video displaying a character making a statement or question to which another character is to respond (the character that the user is being trained to emulate, such as a police officer in this example). The key elements subcomponent displays key or main ideas that are to be used in responding to the challenge (e.g., a statement or question made by a character in a video). The role model user interface displays a video of the character that the user is being trained to emulate stating a response to the challenge. The practice component may be repeated multiple times, as indicated by the navigation user interface, with an arrow bridging brackets visually defining the practice component. By way of further example, some or all of the following may be provided: a challenge video, a role model video, a script, key elements, insights, a recording panel, and/or a help panel.

Optionally, in response to the user hovering over or touching a video playback area (e.g., with a cursor, pointing device, etc.), additional controls may be provided, such as a scrubber control, a volume control, and an expand control. The scrubber control may enable the user to select a point in the video to view or to begin playing from. The expand control may enable the user to cause the video to be displayed in full screen mode.

In this example, the evaluation component the dynamic navigation flow user interface is expanded to indicate it comprises challenge and scoring subcomponents. The scoring subcomponent is further expanded to indicate it includes further subcomponents (sub-subcomponents), including script, key elements, role model, and challenge subcomponents. The evaluation component may be repeated multiple times, as indicated by the navigation user interface, with an arrow bridging brackets visually defining the evaluation component. In this example, other than the scoring itself, the evaluation component optionally includes the same subcomponents as the practice component.

Optionally, the text in the navigation user interface may comprise links, wherein in response to the user activating a given link (e.g., comprising text that describes or identifies a corresponding content component or subcomponent), the user is automatically navigated to a user interface comprising the corresponding component or subcomponent, thereby providing quick, efficient, and accurate navigation.

An instruction video may be presented that optionally includes an animated person providing verbal instructions, where the corresponding voice track is synchronized with the animated person's lip motions, facial expressions, hand or other limb motions, etc. as described elsewhere herein.

Figure 3D:
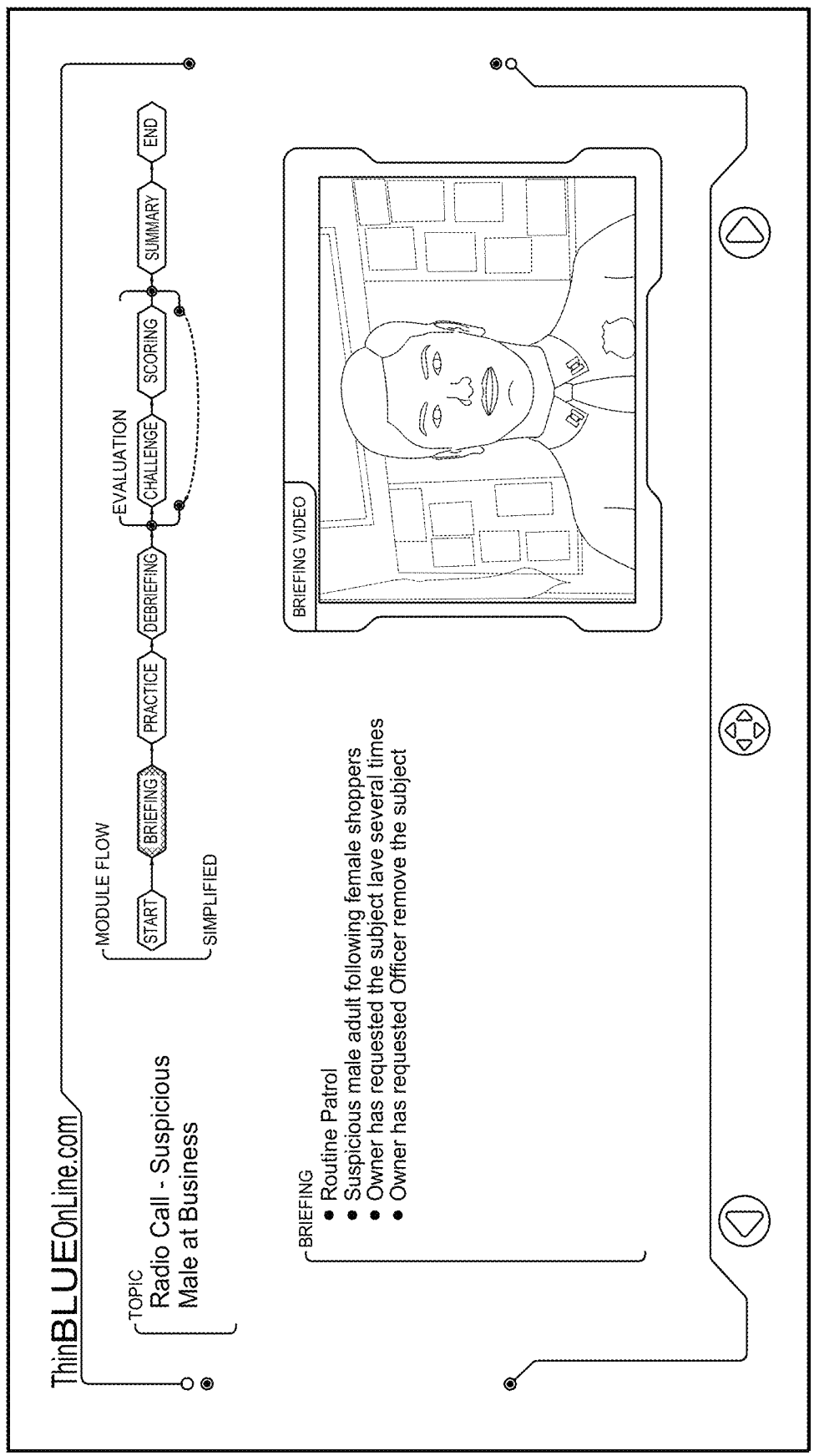

In response to the user activating a next/forward control, the user may be navigated to an initial content component (the briefing component in this example), such as that illustrated in FIG. 3D. In this example, the dynamic navigation flow user interface is updated to be displayed in a simple mode (without all the components expanded) and with the currently rendered component ("briefing") emphasized (e.g., highlighted). Optionally, an expand control is provided which when activated by the user causes the dynamic navigation flow user interface to be re-rendered in expanded mode.

Referring again to FIG. 3D, a text area may be rendered that displays text (e.g., in bullet format). The rendered text in this example provides an overview of a scenario corresponding to multi-perspective animated content that will be displayed (e.g., "Routine Patrol; Suspicious male adult following female shoppers; Owner has requested the subject leave several times; Owner has requested Officer remove the subject").

In this example, a corresponding animation (e.g., a briefing video) is rendered (including corresponding audio) that explains visually and/or audibly a scenario that the user will be trained to respond to. The rendered animation may include a character corresponding to a real world type of person that would give such a briefing in real world circumstances (e.g., to further add authenticity to the training process). In the illustrated example, the animated character is a police captain.

As discussed above, the audio track may be synchronized with facial expressions and with the movements of various body elements (e.g., lips, mouth, eyes, arms, hands, legs, torso, other body parts, and/or clothing, etc.). When the briefing animation is complete, the user may be automatically navigated to the next content component, reducing the need for user navigation inputs. Optionally, in addition or instead, a control is provided via which the user may manually navigate to the next item of content (a practice component as illustrated in FIG. 3D in this example) via a next/forward control to provide the user with more control of the process and content experience. A reverse/previous control is provided to enable the user to navigate to a previous interface. Advantageously, the reverse control of the user interface is on the left hand side so that it is easily accessible and reachable by a left user thumb when displayed on a handheld device with a relatively small touch screen, such as a phone or tablet computer. Similarly, the forward control is on the right hand side so that it is easily accessible and reachable by a right user thumb when displayed on a handheld device with a touch screen. Thus, the user interface is optionally optimized for use on handheld devices, with relatively small (e.g., 2 to 10 inches in the diagonal, 5 to 30 square inches, etc.) touch displays.

Figure 3E:
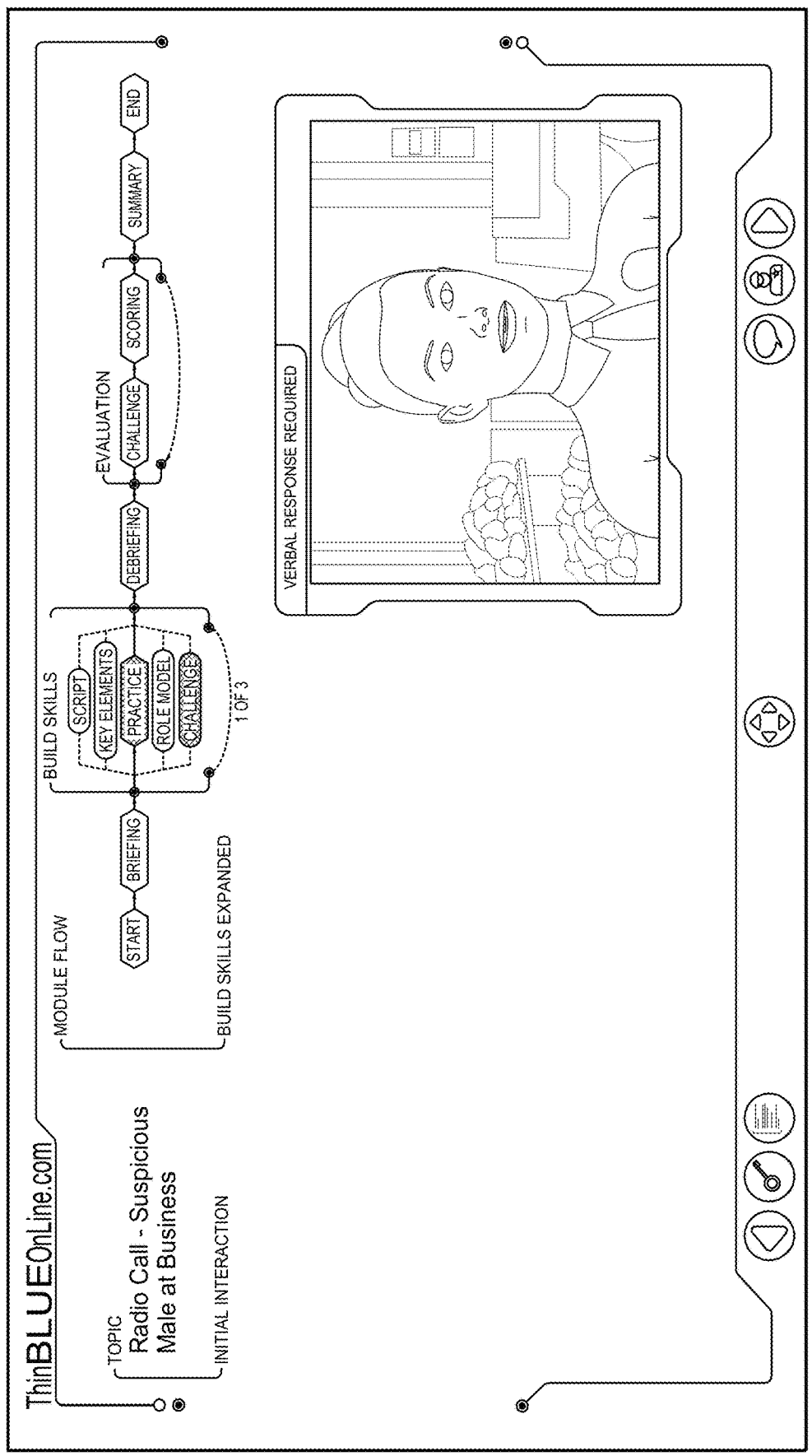

Referring to FIG. 3E, the rendered dynamic navigation flow user interface now emphasizes (e.g., via highlighting) the practice component and has removed the emphasis from the briefing component. The dynamic navigation flow user interface is optionally rendered with the entry for the practice component ("build skill") expanded to indicate its subcomponents (e.g., script, key elements, practice, role model, challenge), while other components are not expanded, making efficient use of display real estate and better ensuring that the navigation user interface is not confusing to the user. Optionally the repeat indicator indicates that there are 3 challenges, and the user is currently about to view the first challenge ("1 of 3"), thereby advantageously enabling the user to know where the user is with respect to the training process embodied in the module. In response to detecting the user viewing the second challenge, the repeat indicator would be dynamically re-rendered and updated to state "2 of 3", and so on. The animation/video player may play a conversation from multiple perspectives (e.g., that of a police officer, the suspicious male the officer is interacting with, etc.).

Figure 3F:
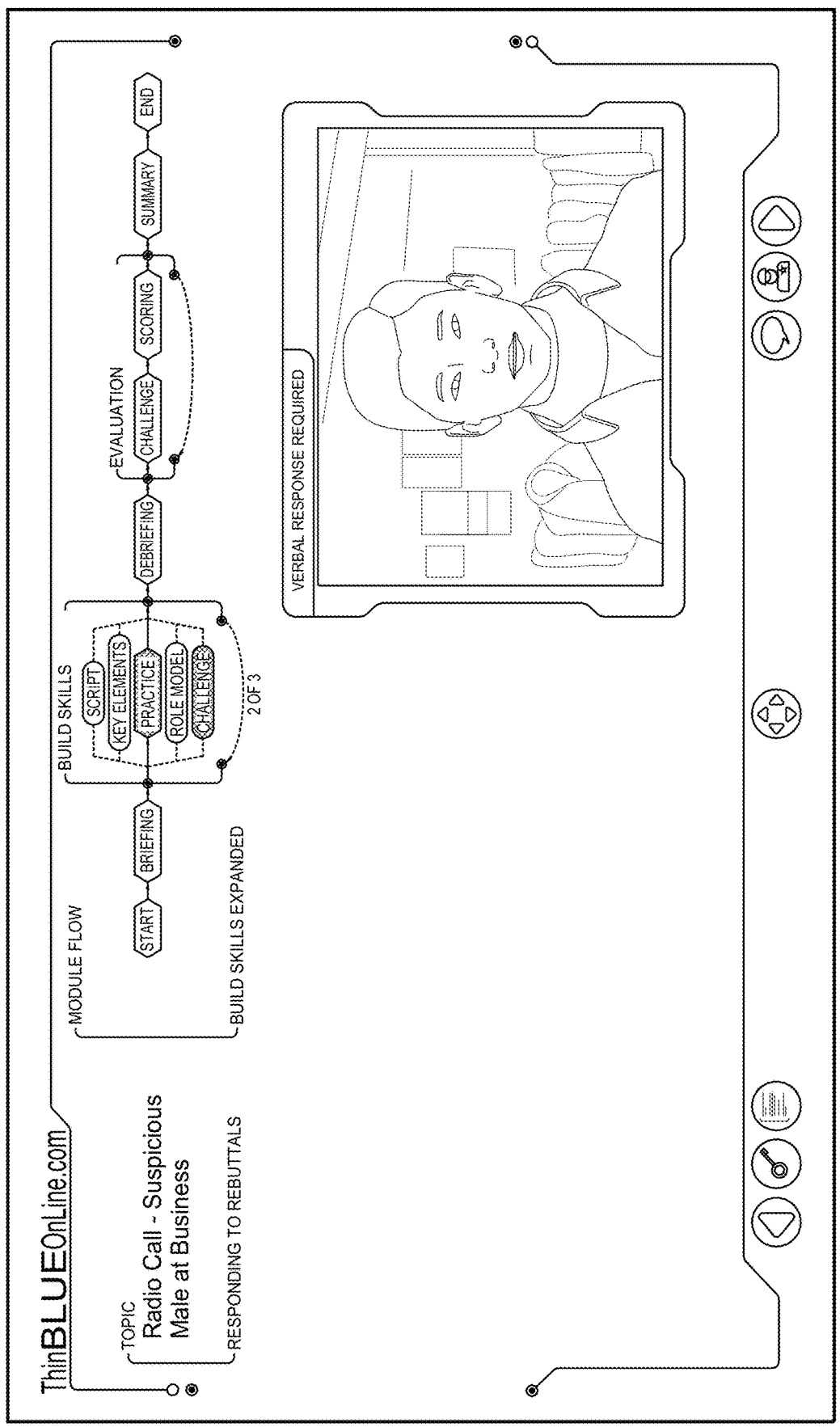

The user may activate a challenge control (e.g., a speech bubble icon), and the animation of the person with whom the officer is interacting with may be rendered and may "speak" his script, which may include "challenges" which the officer needs to respond to, as illustrated in FIG. 3F. The user may audibly speak responses to the challenges as practice and to reinforce the training. As noted above, the user's responses may be recorded via the camera and microphone (e.g., in response to activation of a record control optionally included in the user interface of 3F) so that the user or facilitator may later review the user's performance. Activation of a role model control (e.g., a police officer icon) may cause the animation of the officer to be rendered and to speak role model answers that the user may emulate.

Figure 3G:
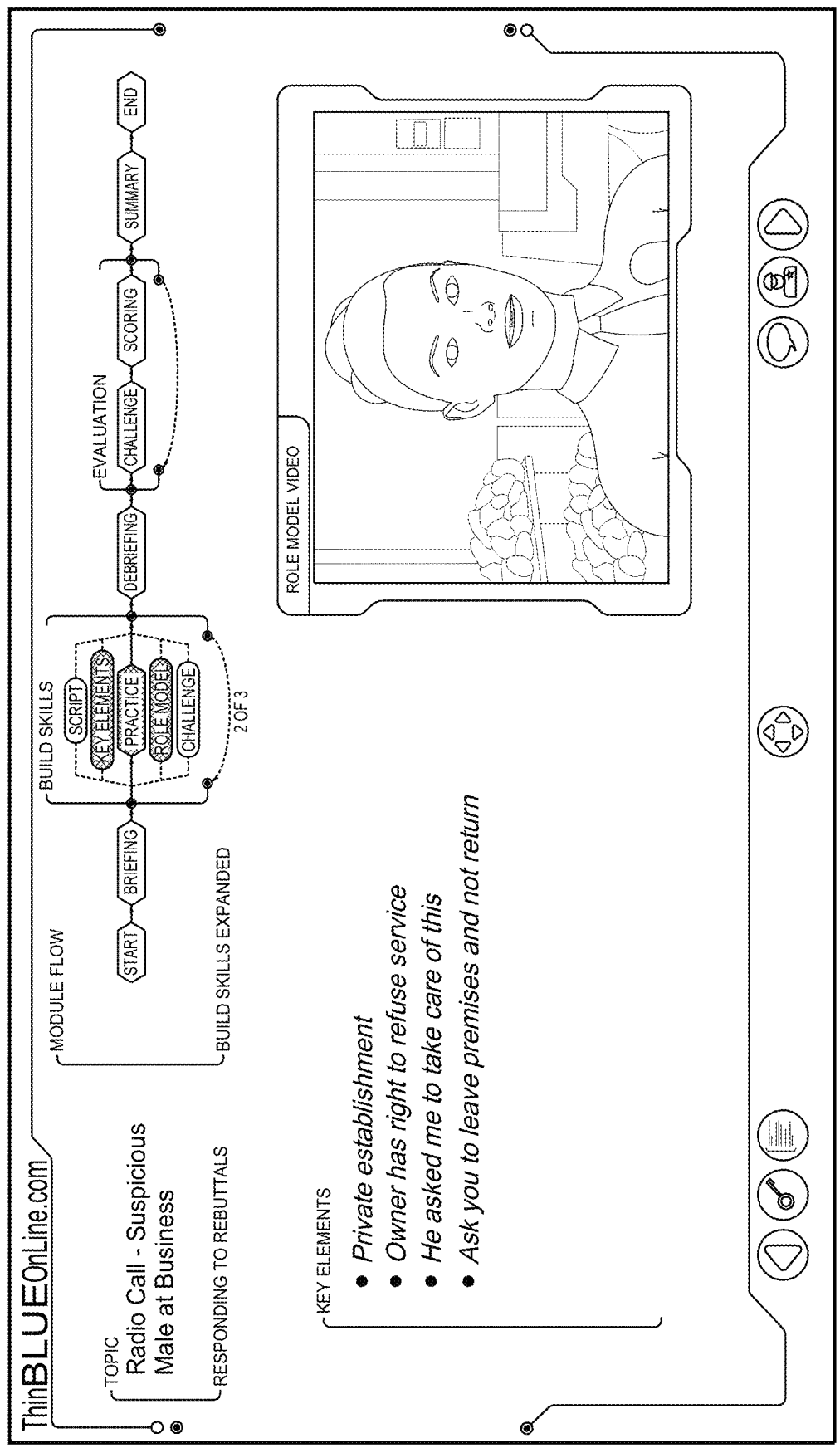

In response to the user activating a key elements control (e.g., in the shape of a key icon), key elements spoken by the police officer are rendered textually (e.g., in bullet format) in real time, as illustrated in FIG. 3G. The user may activate the play control, and in response, the animation video of the police officer will repeat the script, including the key elements. Advantageously, the animation is displayed over the forward control as the user's eyes will tend to be focused on the animation, and hence will be able to quickly locate the forward control (which may be used more often than the reverse control). The dynamic navigation flow user interface may be re-rendered and updated with the practice, key elements, and role model entries emphasized.

Figure 3H:
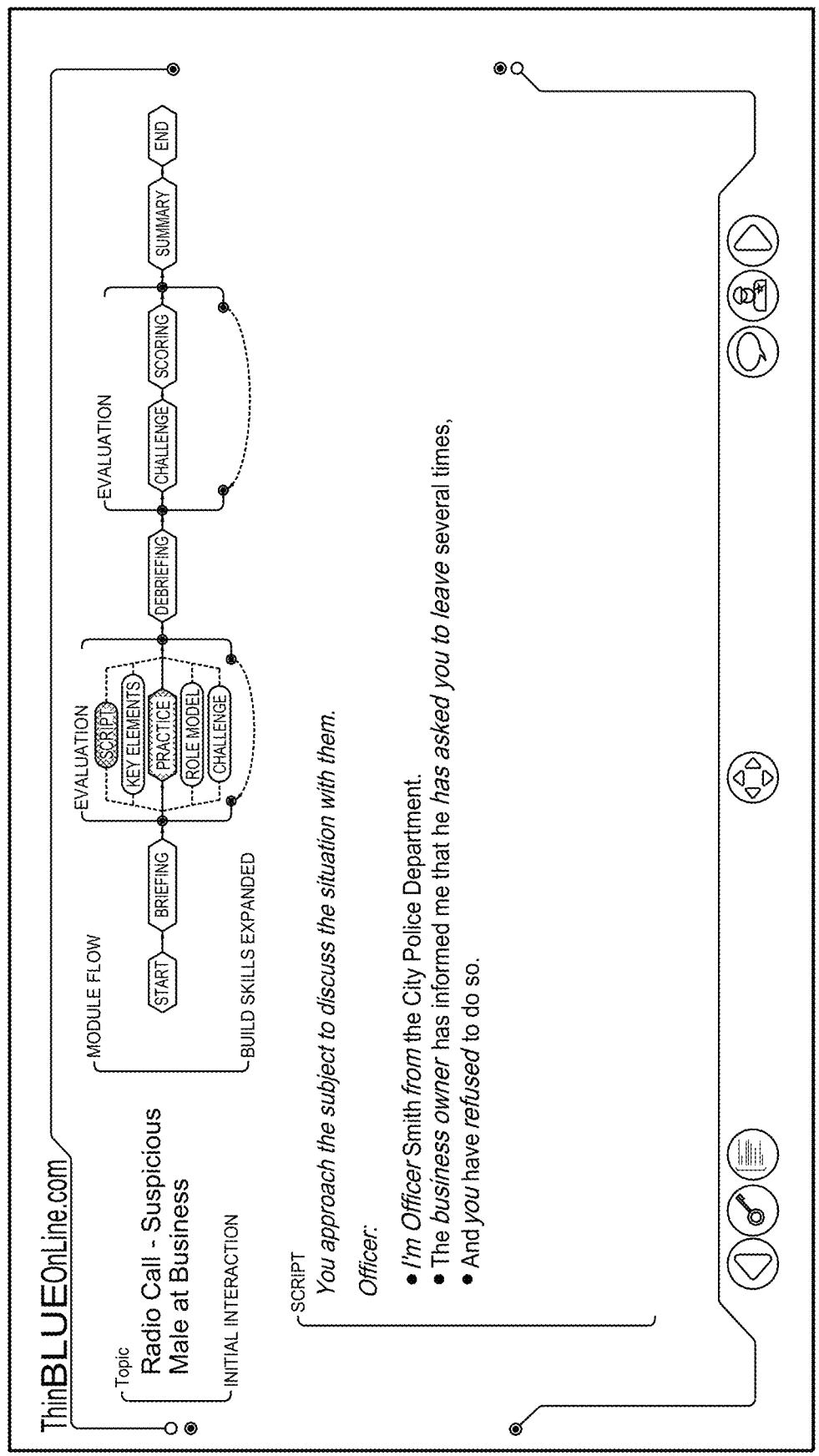

The user may activate a script control (e.g., an icon of multiple lines corresponding to text), and the script of the officer and the person with whom the officer is interacting may be displayed as illustrated in FIG. 3H. Certain portions of the script text corresponding to key elements may be emphasized (e.g., via color, font, highlighting, animation, bolding, underlining, or otherwise).

Some or all of the foregoing key element, script, challenges and role model controls may be displayed on each user interface of the practice component, providing quick and efficient access to the corresponding content, and further enabling the user to access and consume content in a manner that is most conducive to the user.

Figure 3I:
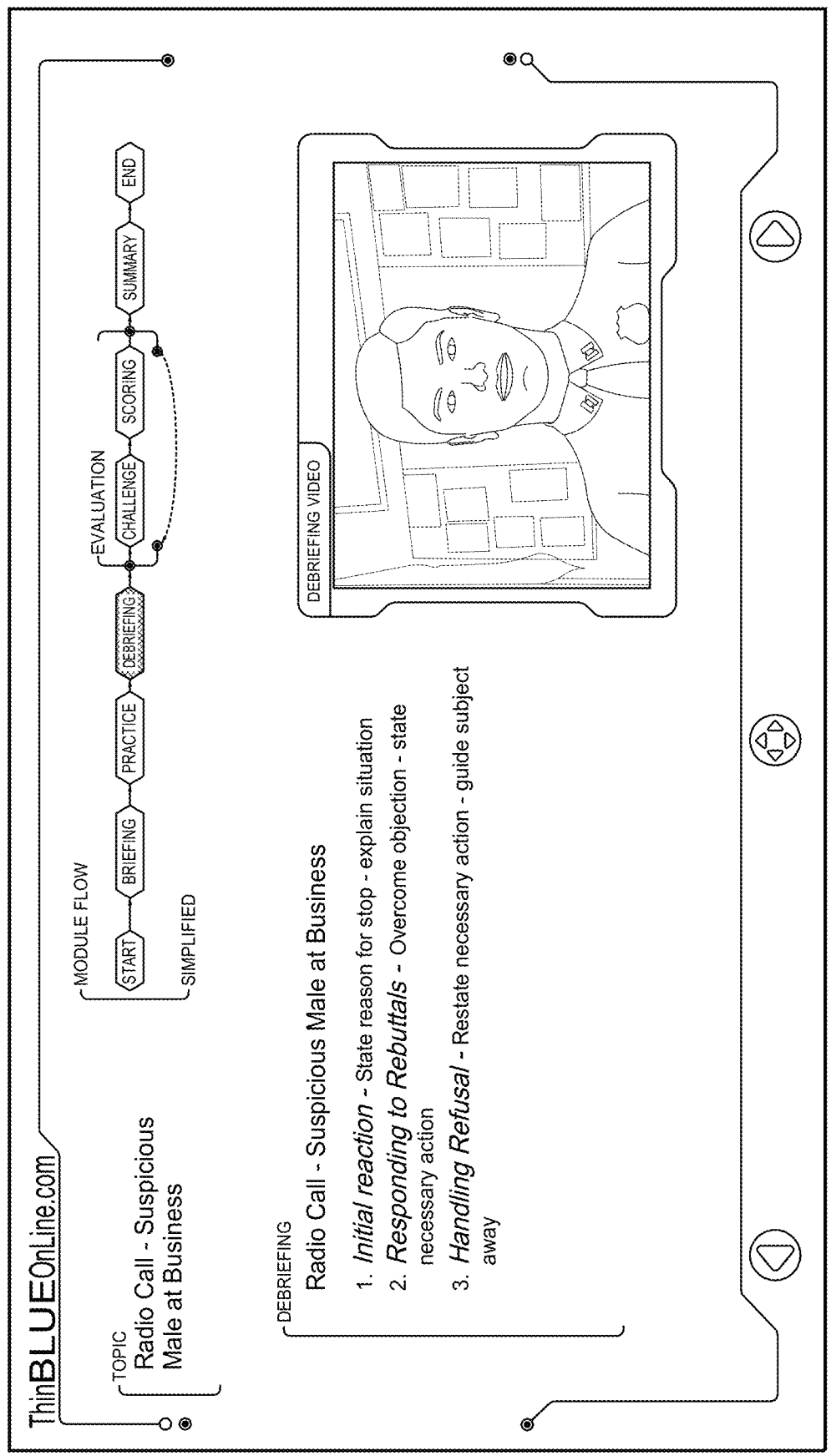

Once the user has completed the practice portion the debriefing user interface may be rendered, as illustrated in FIG. 3I. For example, the user may access the debriefing user interface by completing all the practice challenges or by navigating to the debriefing user interface (e.g., via the dynamic navigation flow user interface, or by activating the forward or reverse controls one or more times) from the practice component or other component. The dynamic navigation flow user interface is now rendered with the debriefing component entry highlighted. The debriefing user interface optionally provides both an animation of a character verbally reviewing what the user has learned and text providing in an ordered, numbered format a textual review of what the user has learned. The combination of an animation, audible speech, and text further reinforces the training content. In addition or instead, the debriefing user interface optionally provides a video of a character and/or text stating possible next steps in the encounter, required follow-up actions, and/or other instructions to complete the scenario.

Figure 3J:
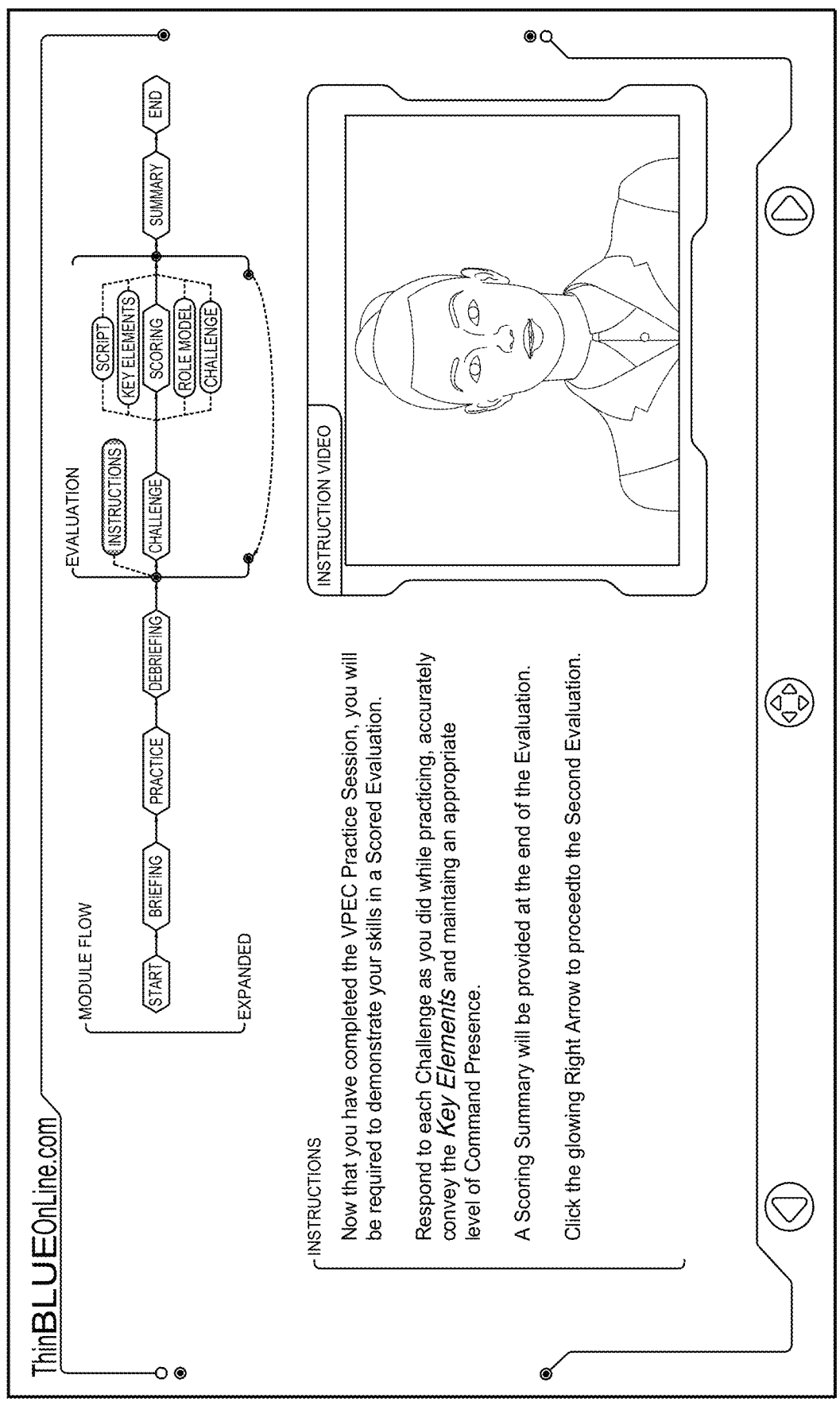

When the debriefing animation is complete, the user may be automatically navigated to the next content component, reducing the need for user navigation inputs. Optionally, in addition or instead, a control is provided via which the user may manually navigate to the next item of content (an instruction subcomponent of an evaluation component as illustrated in FIG. 3J in this example) via next/forward control to provide the user with more control of the process and content experience. Optionally, the user may navigate to the instruction subcomponent using the dynamic navigation flow user interface, by activating a corresponding text/link.

Referring to FIG. 3J, in this example the evaluation component of the dynamic navigation flow user interface is expanded to indicate it comprises instruction, challenge, and scoring subcomponents (with the scoring subcomponent expanded further to indicate it includes script, key elements, role model, and challenge subcomponents). Because the instruction subcomponent is being rendered, the instruction component entry of the dynamic navigation flow user interface is emphasized. The scoring subcomponent is further expanded to indicate it includes further subcomponents (sub-subcomponents), including script, key elements, role model, and challenge components. The evaluation component may be repeated multiple times, as indicated by the navigation user interface, with an arrow bridging brackets visually defining the evaluation component.

An evaluation instruction video may be presented that optionally includes an animated person providing verbal instructions, where the corresponding voice track is synchronized with the animated person's lip motions, facial expressions, hand or other limb motions, etc., as described elsewhere herein. Corresponding instruction text may also be rendered alongside the video. For example, the instructions may state: "Now that you have completed the VPEC Practice Session, you will be required to demonstrate your skills in a Scored Evaluation. Respond to each Challenge as you did while practicing, accurately conveying the Key Elements and maintaining an appropriate level of Command Presence. A Scoring Summary will be provided at the end of the Evaluation. Click the glowing Right Arrow to proceed to the Scored Evaluation."

Figure 3K:
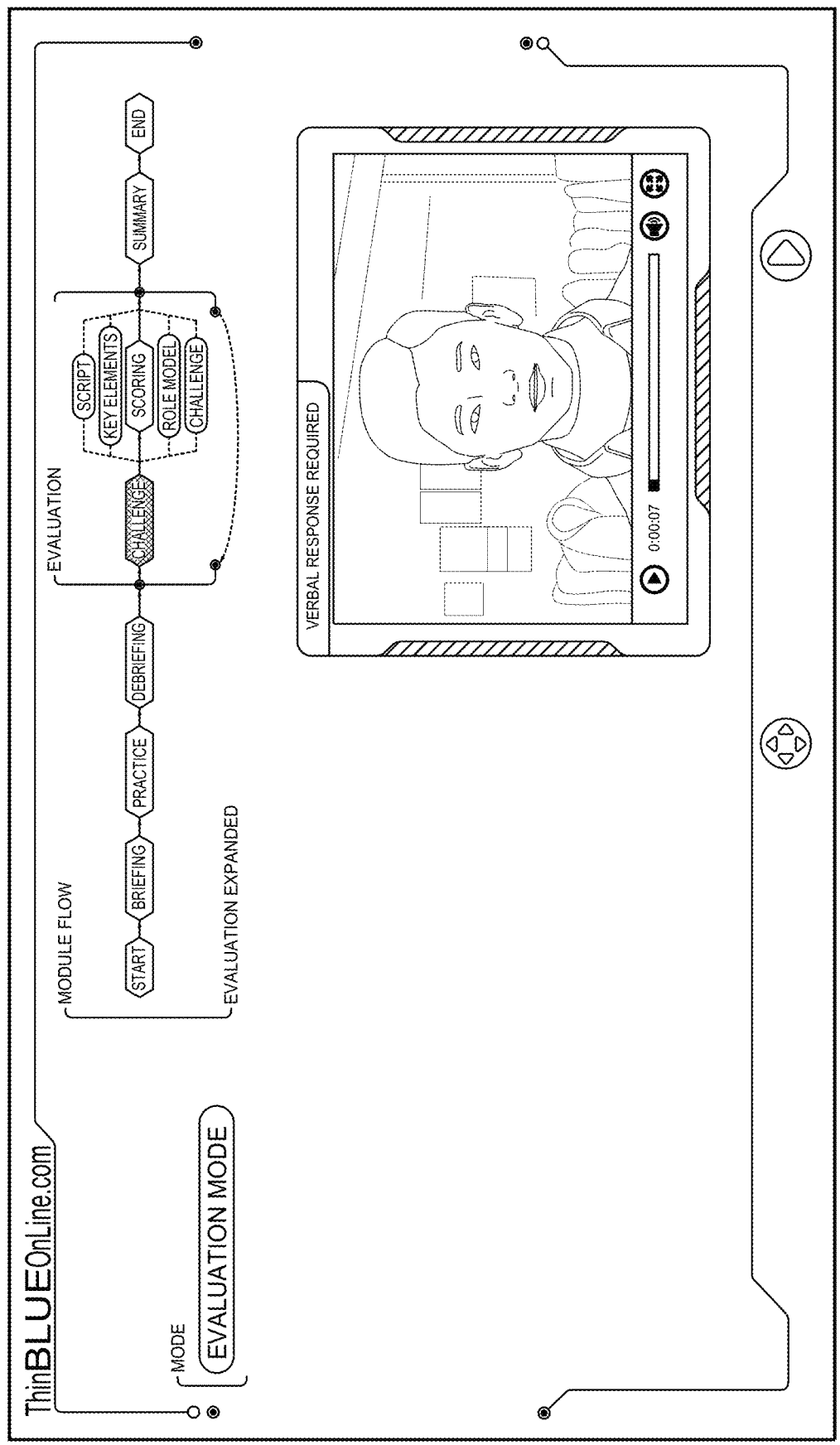

When the instruction animation is complete, the user may be automatically navigated to the next content component, reducing the need for user navigation inputs. Optionally, in addition or instead, a control is provided via which the user may manually navigate to the next item of content (the challenge subcomponent as illustrated in FIG. 3K in this example) via next/forward control to provide the user with more control of the process and content experience. Optionally, the user may navigate to the challenge subcomponent using the dynamic navigation flow user interface, by activating a corresponding text/link. Optionally, the instruction component entry in the dynamic navigation flow user interface is no longer emphasized or displayed, and the challenge component entry is emphasized. The animation of the person with whom the officer is interacting with may be rendered and may "speak" his script, which may include "challenges" which the officer needs to respond to. The user may audibly speak responses to the challenges and the user may be scored on the user response as discussed elsewhere herein. Optionally, the user's response may be recorded by the terminal camera and microphone for later access by the user or by a facilitator.

Figure 3L:
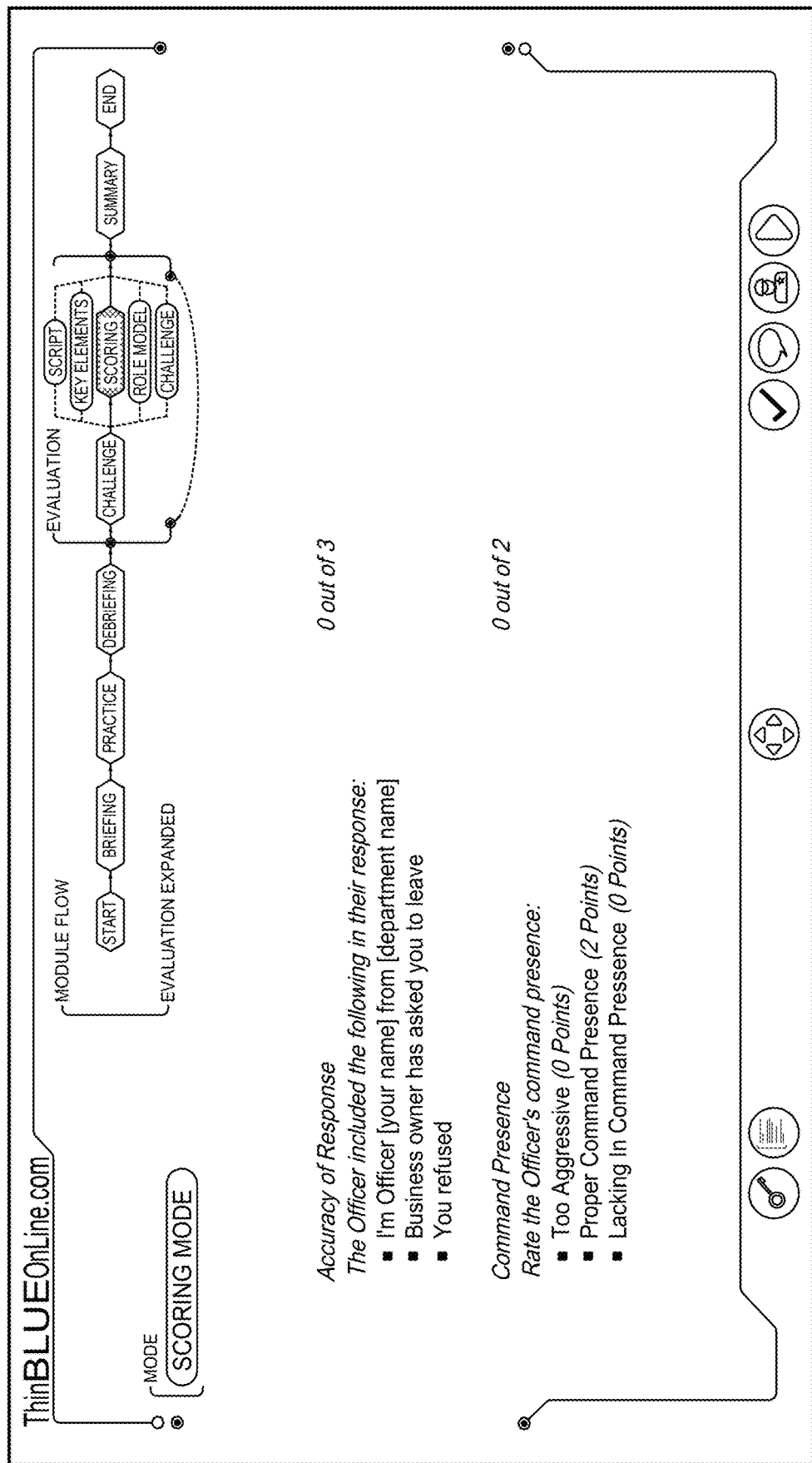

Once the user has responded to the challenge, the scoring user interface illustrated in FIG. 3L may be rendered. Optionally, the challenge component entry in the dynamic navigation flow user interface is no longer emphasized, and the scoring component entry is emphasized. The scoring interface may be rendered on the user terminal display and/or on a separate facilitator display. The scoring may be manually entered by the user and/or the facilitator. For example, the user may be scored (e.g., using a grade, number, or a correct/incorrect indication) on the accuracy of the user's response. By way of illustration, model answer language text may be rendered in conjunction with a scoring input interface to facilitate scoring. For example, a checkbox may be rendered configured to display a check indicating a correct answer in response to a user clicking on or touching the checkbox. The user may be scored on each key element of the model answer. Thus, if the user included two of the listed model answer elements in the response, but not a third element, the user may receive a score of 2 out of 3, and the user interface may be automatically updated in real time to indicate how many element elements the user correctly stated (e.g., "0 out of 3", "1 out of 3", "2 out of 3", etc.).

Optionally, the user may also be scored (e.g., using a grade or number score) on the delivery style (e.g., command presence) of the user's response. For example, the user may receive a score of zero if the user was too aggressive in the response, a score of 2 if the user had proper command presence (e.g., confident and firm but not overbearing or overly aggressive), and a score of zero if the user lacked command presence (e.g., seemed insecure or uncertain).

Advantageously, the optional scoring user interface optionally includes controls to access the key elements user interface, the script user interface, the challenge user interface, and the role model response for the current challenge, enabling the user to further review the foregoing even during an evaluation and scoring phase.

Optionally, a control (e.g., a single button) is provided that when activated causes a practice section for the current challenge to be rendered as a pop-up interface (e.g., overlaying the scoring user interface). The user can then access all of the corresponding content from the pop-up interface, and utilize the various content and controls as desired. When the user closes the pop-up interface (e.g., by selecting a close control), the scoring using interface is displayed at the same status as when the pop-up interface was originally rendered.

Figure 3M:
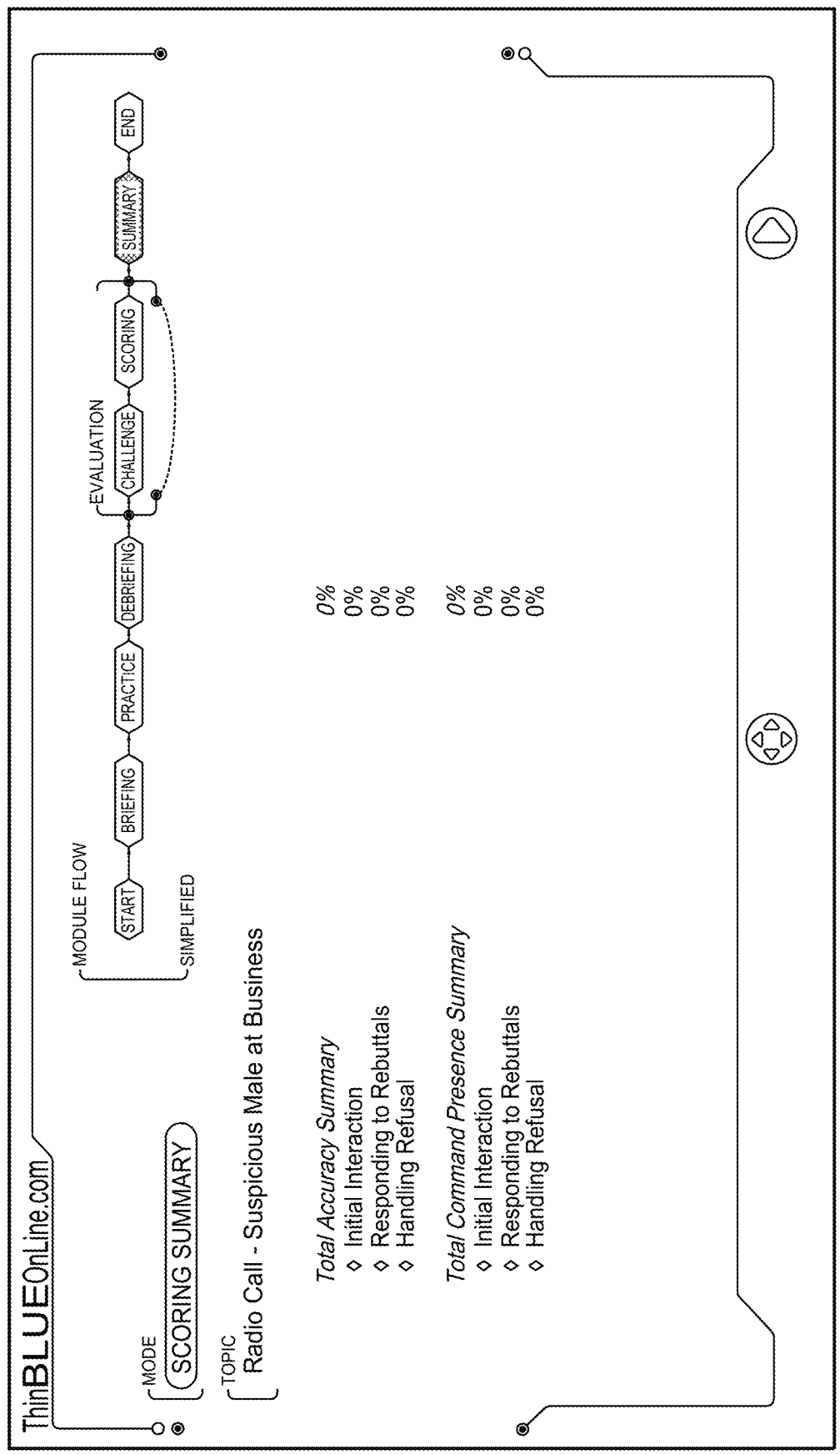

Once the scoring is complete for all the challenges, the scoring summary user interface illustrated in FIG. 3M may be presented. For example, the challenges may have included an initial interaction challenge, a rebuttals challenge, and a refusal challenge. The user may have been scored for accuracy and delivery style (e.g., command presence) on the response to each of those challenges using an interface similar to that of FIG. 3L. Based on the scores, a percent score may be calculated and rendered in association with text describing the corresponding challenge. For example, if the user received a zero with respect to accuracy for a challenge, the user may receive a score of zero percent.

If the user responded correctly to two out of three challenges, the user may receive a score of 66.7%.

Figure 2C:
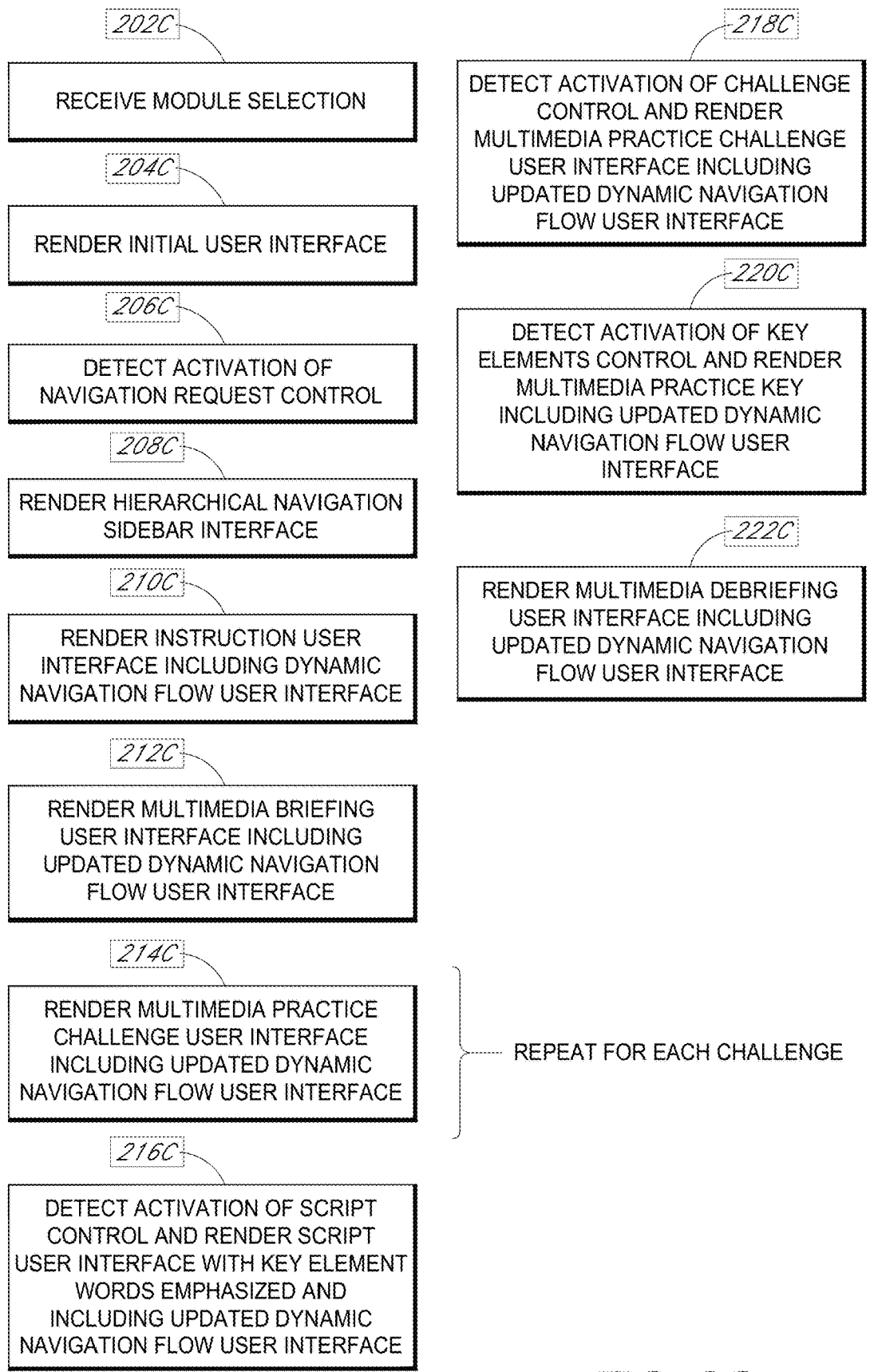
FIGS. 2C-2D illustrate an example process.
Figure 2D:
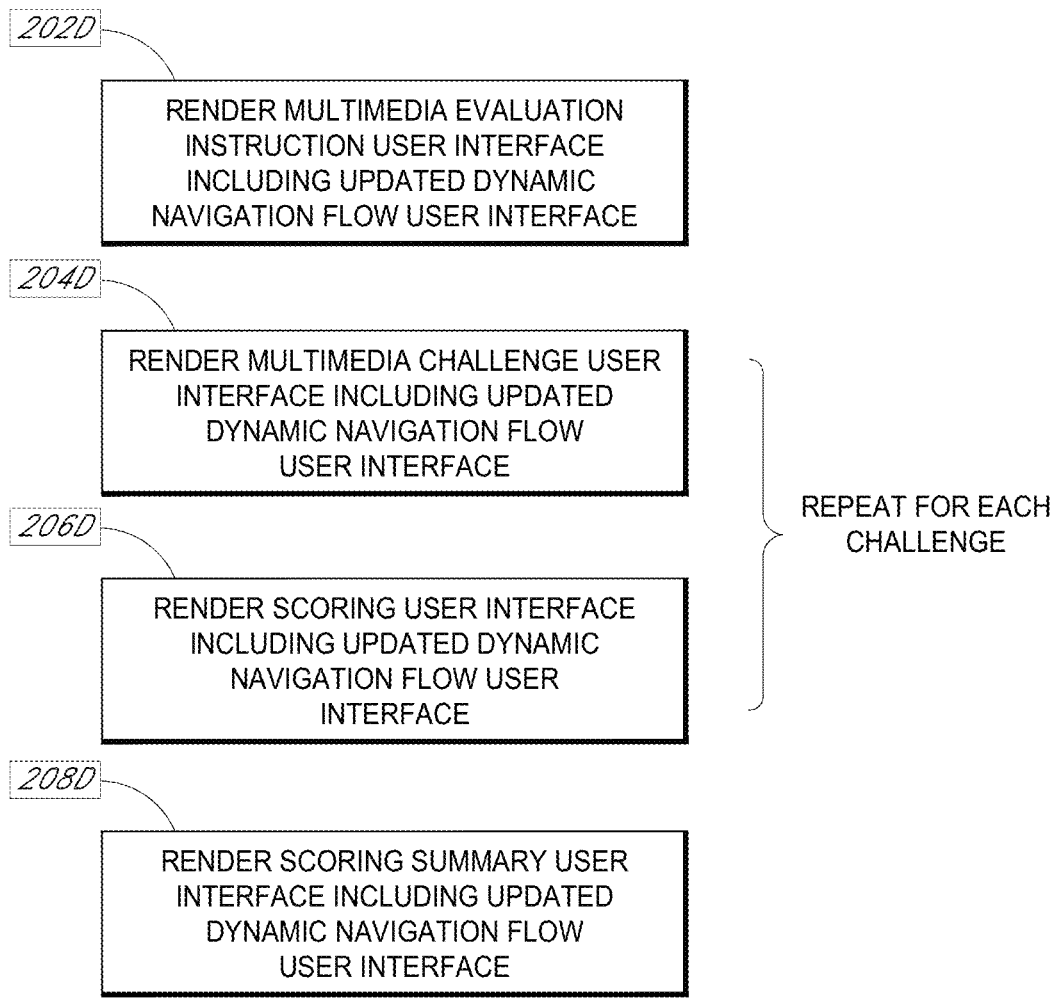

FIGS. 2C and 2D illustrate an example content navigation and content rendering process. At block 202C, a module selection may be received (e.g., from a terminal being accessed by a user, such as a trainee and/or a facilitator/trainer). For example, the module may be a training module comprising video, audio, textual, and/or graphic content. At block 204C, an initial user interface may be rendered. The interface may provide content comprising the module name and one or more controls, such as a navigation request control (see, e.g., FIG. 3A). At block 206C, an activation of the navigation request control is received. At block 208C, a text-based hierarchical navigation interface is rendered (see, e.g., FIG. 3B).

In response to the user activating a control (e.g., a help control), at block 210C an instruction/help user interface comprising a dynamic navigation flow user interface and multimedia (e.g., an instruction audio/video presentation and corresponding text) is rendered (see, e.g., FIG. 3C). As similarly discussed above, the dynamic navigation flow user interface may optionally be rendered in an expanded form with all or certain components expanded to show subcomponents and/or sub-subcomponents. An entry corresponding to the instruction user interface may be highlighted in the dynamic navigation flow user interface.

In response to the user activating a control (e.g., a next/forward control) or activation of the briefing component entry in the dynamic navigation flow user interface, at block 212C a briefing user interface comprising a re-rendered and updated dynamic navigation flow user interface and multimedia (e.g., a briefing audio/video presentation and corresponding text) is rendered (see, e.g., FIG. 3D). As similarly discussed above, the dynamic navigation flow user interface may optionally be re-rendered in a simple form with components un-expanded to conceal subcomponents and/or sub-subcomponents. An entry corresponding to the briefing user interface may be highlighted in the dynamic navigation flow user interface.

In response to the user activating a control (e.g., a next/forward control) or activation of the challenge component entry in the dynamic navigation flow user interface, at block 214C a challenge user interface comprising a re-rendered and updated dynamic navigation flow user interface and multimedia (e.g., a briefing audio/video presentation and corresponding text) is rendered (see, e.g., FIG. 3E). As similarly discussed above, the dynamic navigation flow user interface may optionally be re-rendered and updated with the practice/build skills component expanded to show sub-components, with other components un-expanded to conceal subcomponents and/or sub-subcomponents. An entry corresponding to the challenge user interface may be highlighted in the dynamic navigation flow user interface. In addition, where there are multiple challenges in the practice component, the system may determine what challenge the user is viewing and how many challenges are included in the practice component, and the dynamic navigation flow user interface may be rendered to indicate which challenge the user is viewing and how many total practice challenges there are (e.g., "1 of 3"). When the user accesses the next challenge (e.g., by activating a forward control or view the dynamic navigation flow user interface), the dynamic navigation flow user interface may be re-rendered to identify the current challenge (e.g., "2 of 3").

At block 216C, in response to detecting activation of the script control, a script user interface may be rendered (see, e.g., FIG. 3H) including text of the script spoken by one or more characters in the challenge video (e.g., the police officer), and the text may be rendered with key element words emphasized (e.g., using color, font, highlighting, bolding, underlining, animation, etc.) relative to surrounding text. The dynamic navigation flow user interface may be re-rendered and updated with the practice, and script entries emphasized.

At block 218C, in response to detecting activation of the challenge control the previously viewed challenge may be played again via a challenge user interface. The dynamic navigation flow user interface may accordingly be re-rendered and updated.

At block 220C, in response to detecting activation of the key elements control, a key elements user interface may be rendered (see, e.g., FIG. 3G). Key elements spoken by a character (e.g., the police officer) may be rendered textually (e.g., in bullet format), and a video user interface may be displayed including an initial or title frame. The user may activate a play control, and in response, the animation video of the character will repeat a role model script, including the key elements. The dynamic navigation flow user interface may be re-rendered and updated with the practice, key elements, and role model entries emphasized.

Thus, during the practice mode, the user may access a video of a role model response, an interface providing key elements of the role model response in bullet format, and a script of the role model response with words corresponding to the key elements visually emphasized, thereby further reinforcing challenge response concepts and language. Optionally, the interface includes an insights interface, a recording panel interface, and a help interface.

At block 222C, a debriefing user interface is rendered (see, e.g., FIG. 3I). The user may access the debriefing user interface by completing all the practice challenges or by navigating to the debriefing user interface (e.g., via the dynamic navigation flow user interface, or by activating the forward or reverse controls one or more times) from the practice component or other component. The dynamic navigation flow user interface is re-rendered and updated with the debriefing component entry highlighted. The debriefing user interface optionally provides both an animation of a character verbally reviewing what the user has learned and text providing in an ordered, numbered format a textual review of what the user has learned. In addition or instead, the debriefing user interface optionally provides a video of a character and/or text stating possible next steps in the encounter, required follow-up actions, and/or other instructions to complete the scenario.

Referring to FIG. 2D, an example evaluation is illustrated. At block 202D, an instruction user interface comprising a re-rendered updated dynamic navigation flow user interface and multimedia (e.g., an instruction audio/video presentation and corresponding text) is rendered (see, e.g., FIG. 3J). As similarly discussed above, the dynamic navigation flow user interface may optionally be rendered with the evaluation component entry expanded to show subcomponents and/or sub-subcomponents. An entry corresponding to the evaluation component instruction user interface may be highlighted in the dynamic navigation flow user interface. The evaluation component may be repeated multiple times with multiple challenges, with an arrow bridging brackets visually defining the evaluation component.

At block 204D, in response to the user activating a control (e.g., a next/forward control) or activation of the challenge component entry in the dynamic navigation flow user interface, a challenge user interface comprising a re-rendered and updated dynamic navigation flow user interface and a video of a character audibly stating a challenge is provided (see, e.g., FIG. 3K). The challenge may be the same as a challenge presented during the practice mode. The user responds to the challenge. The response should include key elements from the role model response during the practice mode.

Once the user has responded to the challenge, and in response to the user activating a control (e.g., a next/forward control) or activation of the challenge component entry in the dynamic navigation flow user interface, at block 206D, a scoring user interface is rendered comprising a re-rendered and updated dynamic navigation flow user interface and scoring fields and answers comprising key elements (see, e.g., FIG. 3L). The challenge component entry in the re-rendered, updated, dynamic navigation flow user interface is no longer emphasized, and the scoring component entry is emphasized. As discussed above, during the practice mode, the user may access a video of a role model response, an interface providing key elements of the role model response in bullet format, and a script of the role model response with words corresponding to the key elements visually emphasized. The user is to respond to the challenge using the corresponding key elements learned during the practice phrase.

The scoring interface may be rendered on the user terminal display and/or on a separate facilitator display. Optionally, the scoring may be manually entered by the user and/or the facilitator. For example, the user may be scored on the accuracy of the user's response with respect to the inclusion of key elements. By way of illustration, model answer language text may be rendered in conjunction with a scoring input interface to facilitate scoring. Optionally, the user may be scored on each element of the model answer. Thus, if the user included two of the listed model answer elements in the response, but not a third element, the user may receive a score of 2 out of 3, and the user interface may be automatically updated in real time to indicate how many element elements the user correctly stated. As discussed above, the user may also be scored (e.g., using a grade or number score) on the delivery style (e.g., command presence) of the user's response. For example, the user may receive a score of zero if the user was too aggressive in the response, a score of 2 if the user had proper command presence (e.g., confident and firm but not overbearing or overly aggressive), and a score of zero if the user lacked command presence (e.g., seemed insecure or uncertain).

Blocks 204D and 206D may optionally be repeated until the process detects that all the evaluation challenges have been shown and scored.

At block 208D, once the scoring is complete for all the challenges in the evaluation component, a scoring summary may be automatically generated and rendered via a scoring summary user interface (see, e.g., FIG. 3M). For example, the challenges may have included an initial interaction challenge, a rebuttals challenge, and a refusal challenge. Based on the scores, a percent score may be calculated and rendered in association with text describing the corresponding challenge.

Certain additional example user interfaces will now be described with reference to FIGS. 4A-4G.

In the illustrated examples, the content displayed in a given panel/area may change depending on the state the user is in in a learning process flow. For example, with reference to Table 1 below, certain user interfaces may contain a left panel and a right panel, where the content displayed in a given panel may automatically change based on the current state in the flow. Advantageously, all the content for each panel may optionally be downloaded to and resident in memory on the user device, so that as the user navigates through the flow, the change in content in a given panel may take place instantaneously.

TABLE 1

| STATE | LEFT PANEL | RIGHT PANEL |
| --- | --- | --- |
| CHALLENGE | CHALLENGE VIDEO | INSIGHTS (provides additional "thoughts" on the scenario to the learner) |
| OBSERVE | ROLE MODEL VIDEO | KEY ELEMENTS |
| PRACTICE | CHALLENGE VIDEO | RECORDING PANEL (enables user to self-record and playback user responses to challenge) |

It is understood that Table 1 corresponds to one example configuration. Table 2 below corresponds to another example configuration. However, these examples are non-limiting and other configurations may be used.

TABLE 2

| STATE | LEFT PANEL | RIGHT PANEL |
| --- | --- | --- |
| CHALLENGE | CHALLENGE VIDEO | BLANK |
| OBSERVE | ROLE MODEL VIDEO | FULL SCRIPT |
| PRACTICE | CHALLENGE VIDEO | RECORDING PANEL (enables user to self-record and playback user responses to challenge) |
| REVIEW | CHALLENGE VIDEO | KEY ELEMENTS |

Figure 4A:
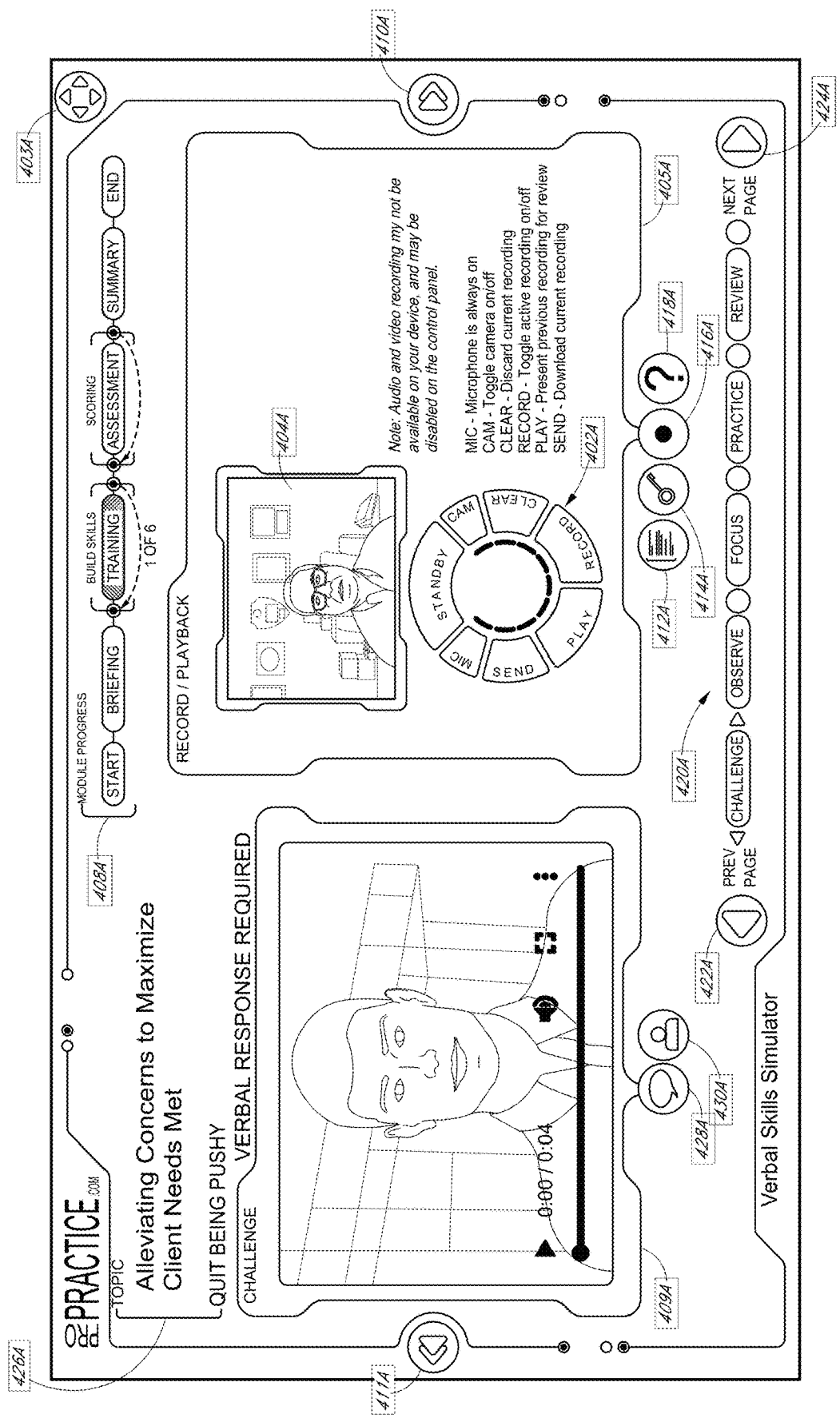
FIGS. 4A-4H illustrate additional example user interfaces.

Referring to FIG. 4A, an example user interface (a training user interface for learning skills in this example) is illustrated. The example user interface provides a wide range of features, capabilities, and flexibility. In this example, the user interface may present some or all of the following: video content comprising challenges, video content of role model responses, helpful text, recording and playback controls that enables the user to record and view the user's own responses to challenges, a pre-programmed learning path/process, a dynamic navigation flow user interface that corresponds to the learning path/process, and controls that enable the user to customize the presentation in a way that is more satisfactory for the user.

In contrast to rigid conventional eLearning systems, which rely upon static pages and learning/training flows, the systems and methods described herein enable a user to explore the content in various ways to allow the user to access content and perform training in a way the best suits the user. Further, the systems and methods described herein facilitate repeated user practice on the relevant subject matter, in addition to reading text and watching videos. For example, the example training user interface illustrated in FIG. 4A enables the user to practice realistic communication in a safe and non-embarrassing way, enables the user to record practice sessions, and enables the user to self-evaluate her own performance. The training user interface, as well as other user interfaces described herein, enable the user to improve the user's performance.

The example training user interface includes the following areas: a topic area 426A, a dynamic navigation flow user interface 408A, a video area 409A for displaying prerecorded video via a video player, a text area 405A (see, also FIG. 4E), and a learning step interface 420A. Each of these user interface areas and associated controls will now be described.

Figure 4B:
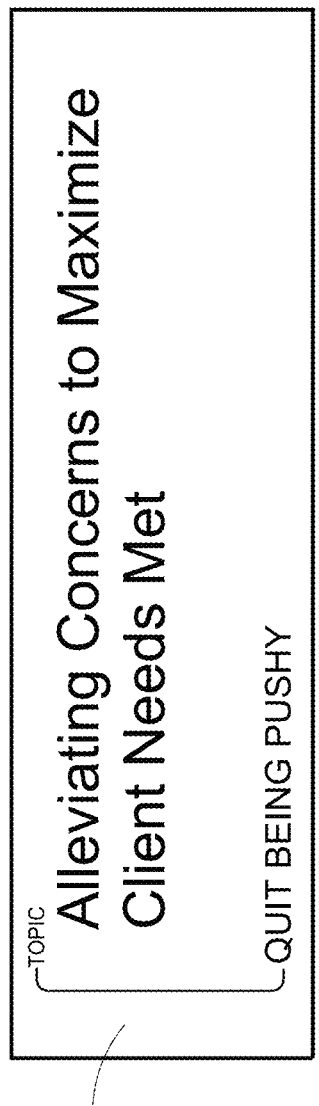
Figure 4C:
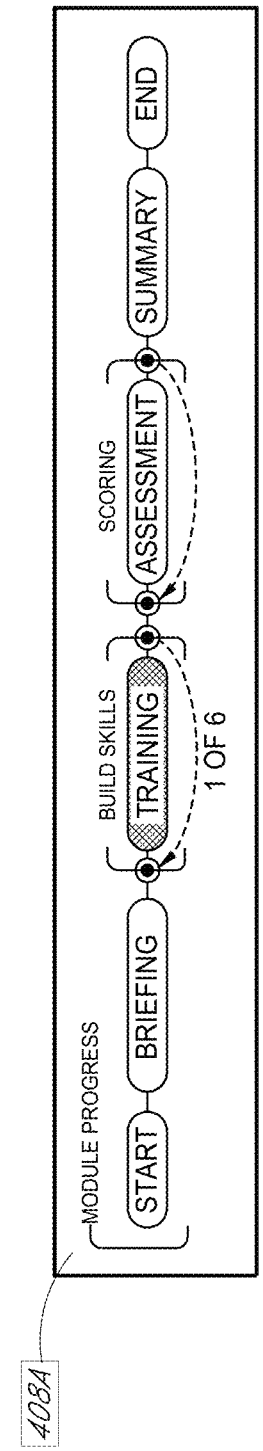
Figure 4D:
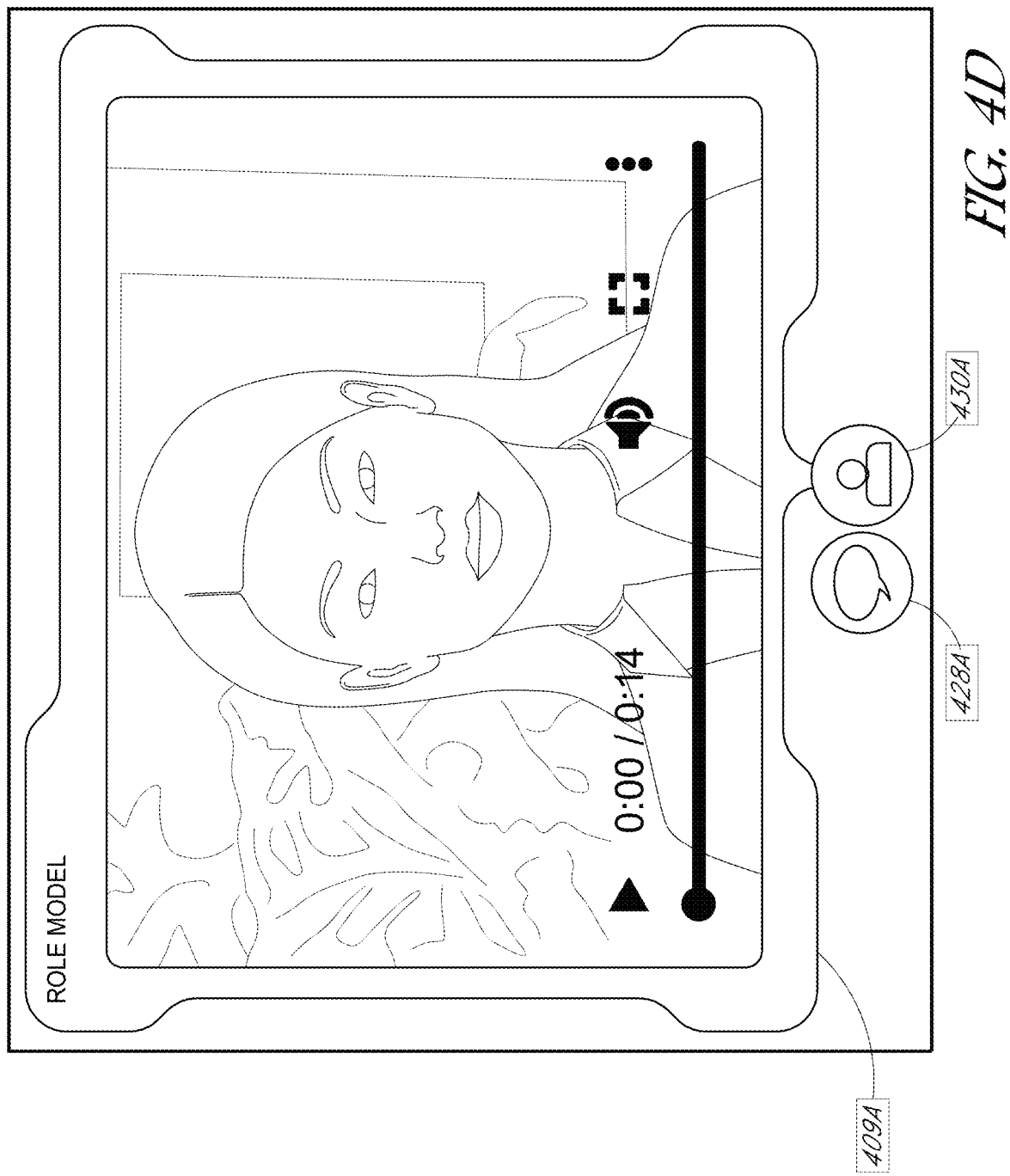

The topic area 426A is displayed in the upper left corner of the user interface. The topic area 426A includes the name of the current module and the specific learning object within the current module. Optionally, the topic area 426A does not include navigation controls. An expanded view of the topic area 426A is illustrated in FIG. 4B.

The dynamic navigation flow user interface 408A (see, also, FIG. 4C) corresponds to the selected module, where the dynamic navigation flow user interface 408A may indicate a user's progress through the module flow. Certain flow states may also be rendered with descriptive text (e.g., "build skills", "scoring", etc.).

In this example, the dynamic navigation flow user interface 408A includes a "start" state, a "briefing" state, a "training" (build skills) state, an "assessment" (scoring) state, a "summary" state, and an "end" state. A repeat indicator displayed in association with the training state (1 of 6) indicates that there are 6 training presentations/sessions. Another repeat indicator is displayed in association with the assessment state.

The navigation flow user interface 408A may be dynamically rendered to indicate (e.g., via highlighting, color, animation, or otherwise) which flow state is currently being displayed to the user to advantageously indicate where the user is in the module training process. In this example, the training state is emphasized (e.g., highlighted), to indicate the user is accessing the training content. The states may be indicated by rendering the state name using a different form of emphasis (e.g., by rendering the state name in a specific type of geometric shape, such as a six-sided polygon, using a different color, using a different font, underlining, and/or otherwise).

The dynamic navigation flow user interface 408A optionally enables the user to navigate directly to a specific module section/display combination (e.g., page) by clicking on or touching the corresponding section/display combination in the dynamic navigation flow user interface 408A. Optionally, for multi-step items (e.g., a practice section), a menu (e.g., a dropdown menu) is rendered with entries for each of the module challenges. The menu enables a user to jump to a specific desired challenge by selecting the desired challenge. Thus, for example, if the user is currently on the first challenge (e.g., "1 of 6" challenges), the user may select and jump to any of the other five challenges via the menu.

Discrete module navigation controls are provided that enable a user to manually navigate through module documents/display combination (e.g., pages). In this example, a next page control 410A is provided which when activated cause the application to navigate to the next module display combination (e.g., the next step in the flow). A previous display combination control 411A is provided which when activated cause the application to navigate to the previous module display combination (e.g., the previous step in the flow). For example, activation of the next display combination control 410A may navigate the user to the next learning object training section/display combination in the module, or to an assessment section/display combination if the user is currently on the last learning object. The previous display combination control 411A may navigate the user back to the previous learning object training section/display combination, or back to a briefing section/display combination if the user are currently on the first learning object.

An optional menu control 403A is provided that, when activated, causes a menu interface to be displayed. The menu interface optionally includes an indented outline of the module contents. The menu entries may be linked to other content, such as a corresponding module section/display combination or learning object. Activating an entry in the outline (e.g., by touching or clicking on the entry) navigates the user to the corresponding section/display combination in the module, or to a specific learning object within the module.

The video area 409A (illustrated in greater detail in FIG. 4D) may play, via a video player, prerecorded video content (which may include an audio track) such as a challenge video (e.g., a real or animated person speaking one or more questions or statements), or a role model video (e.g., a real or animated person speaking a best practice response to a challenge). Optionally, when the displayed video changes from a challenge video to a role model video (or vice versa), the new video is automatically played. Optionally, a play control is provided, which the user can manually activate to cause the current video to be played or replayed.

Activation of a challenge control 428A causes the challenge video to be loaded into and played by the video player in the video area 409A. Activation of a role model control 430A causes the role model video to be loaded into and played by the video player in the video area 409A.

When a video is loaded into the video player in the video area 409A, the corresponding control (e.g., the challenge control 428A or the role model control 430A) may be graphically emphasized (e.g., via animation, a color outline, or otherwise) to indicate which video-type (e.g., a challenge video or a role model) is being displayed, thereby reducing user confusion.

The text area 405A may display text data (e.g., in the right side of the training user interface illustrated in FIG. 4A). An example text area interface is displayed in FIG. 4E. The text may be displayed in association with icons or other graphics. For example, the text area may be used to display control icons (e.g., recording controls) and corresponding text explaining the functionality and/or use of the control. By way of further example, the text area may display a full script of a role model response or only key elements (e.g., key concepts in numbered of bulleted form) of the role model response. The text area panel may be sized to be larger than the other interfaces of the training user interface to better focus the user on the text area content and to make the text easier to read.

Figure 4E:
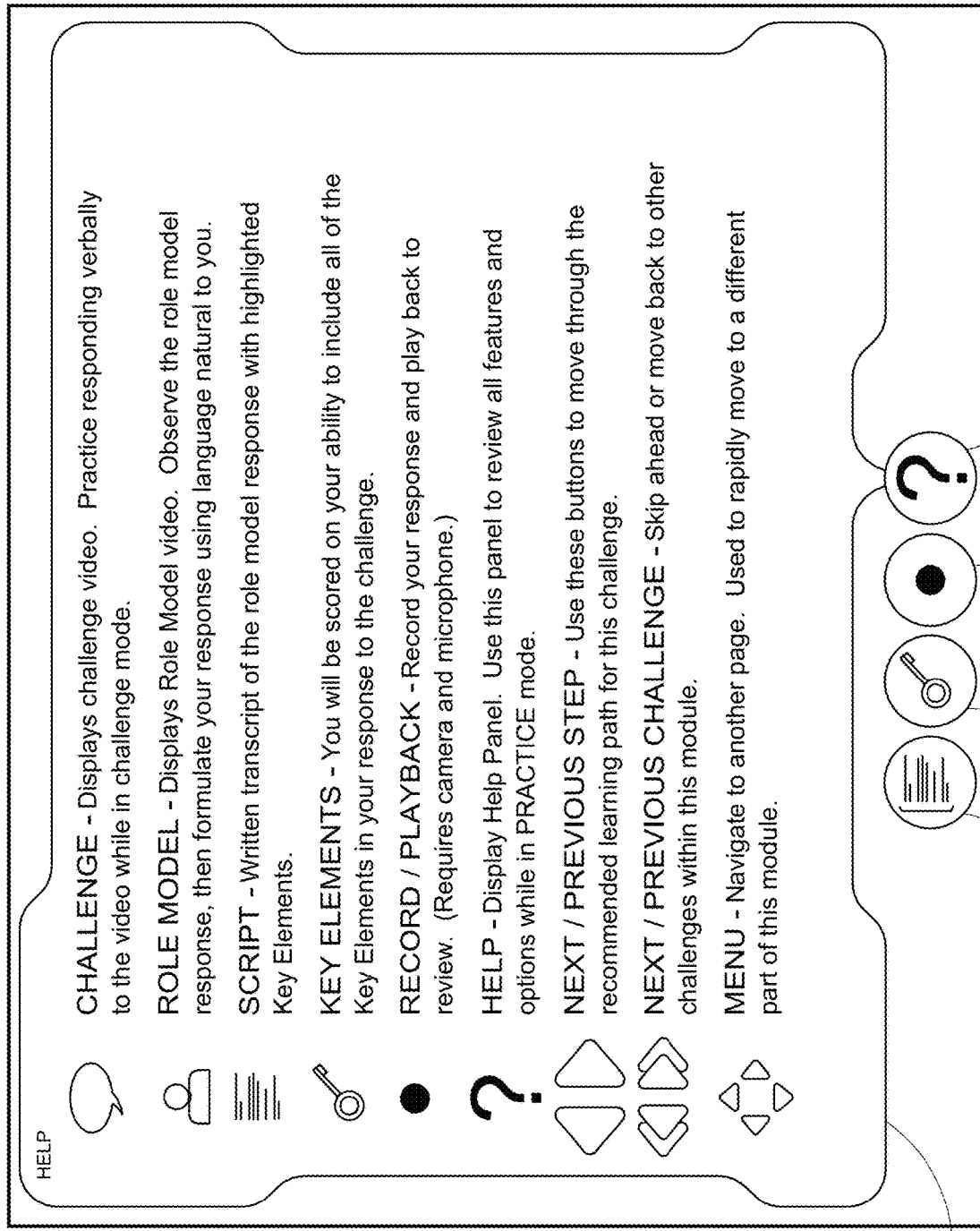

With respect to FIGS. 4A and 4E, controls may be provided via which the user can control what text and related information is displayed in the text area. For example, activation of a script control 412A may cause a text transcript of the role model response to be displayed. Optionally, activation of the script control 412A may cause a text transcript of the role model response to be displayed with the key elements that are spoken in the role model response highlighted (e.g., using color, outlines, etc.), indicating how the key elements are incorporated into the role model response.

Optionally, activation of the key elements control 414A causes the text corresponding to the key elements spoken within the role model response to be displayed without surrounding text (e.g., in numbered or bullet format). Activation of the record/playback control 416A may the more detailed record/playback/pause/cam/clear/microphone controls 402A to be displayed that enable the user to create and playback an audio and/or video recording of the user. This functionality enables the user to review the user's own tone, expressions, body language, or the completeness and accuracy of the user's response, thereby enabling the user to improve the her performance. Thus, the user may elect, at the user's discretion, to record and review the user's own performance.

Activation of the help control 418A causes a listing of some or all controls to be displayed in association with a brief description of their functionality (see, e.g., FIG. 4E).

Optionally, the user may be enabled to clear the text area 405A (e.g., by re-clicking on the control for the current content).

Thus, the foregoing controls enable the user to select among various options, the content displayed in the video area and the content displayed in the text area.

The functions of the record/playback/pause/cam/clear/microphone controls/indicators 402A will now be described. The controls/indicators are positioned closely together. The indicator text is optionally sized larger then the control text to make the indicators more easily read, resulting in less user errors. In the illustrated example, the top segment text (in a recording state indicator) is re-rendered as the recording mode changes to reflect the current mode (e.g., standby, recording, playback).

The recording mode may default to a standby mode (with the state indicator indicating a standby state), and may return to the standby mode when exiting record or playback modes. When in a standby mode, the camera and/or microphone of the user device are turned on and active, but are not recording video or audio. When the camera is active, the live streaming view of the camera may be presented in real time via the video display area 404A. When the recording control is activated, the camera and/or microphone of the user device are on and active, and are recording video or audio. Optionally, the video may also be live streamed and displayed in the video display area during the recording process. Optionally, the video may be displayed in a full screen mode. When the playback control is activated, the video display area 404A will display the playback of the recording of the user, and the audio track will be played back via the user device speakers.

Figure 4F:
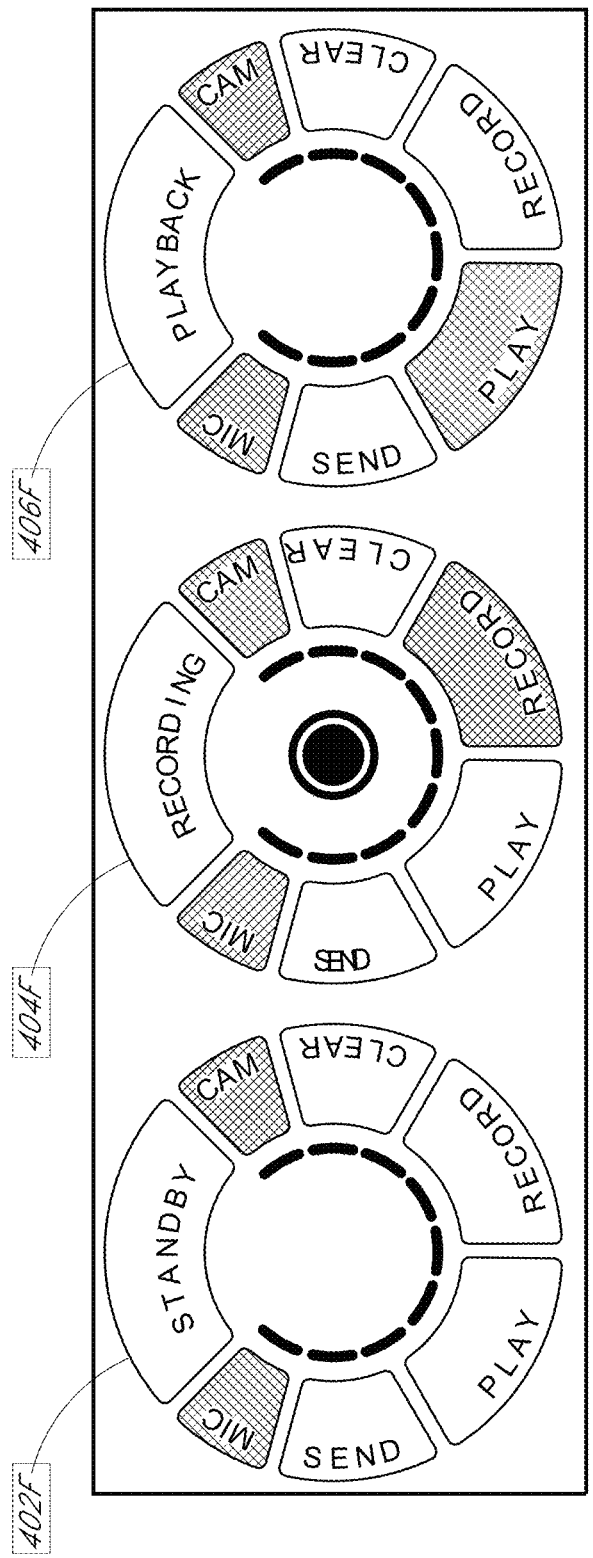
Figure 4G:
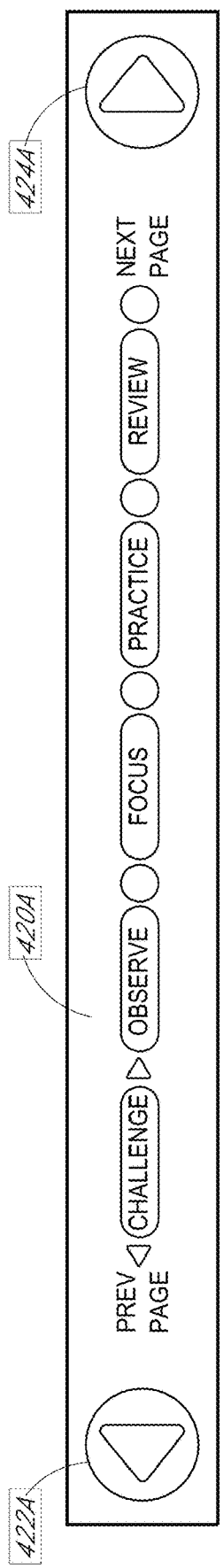

A status indicator may be provided that indicates (e.g., via a change in color, icon, and/or text) whether the camera/microphone or in standby mode, record mode, or playback mode. In addition, or instead, the color of the controls may themselves be changed when activated or deactivated. FIG. 4F illustrates example display states of the controls 402A (standby 402F, recording 404F, playback 406F). The controls/indicators are optionally in the form of a multi-segment, circular control set to provide dense, yet easy to access and well organized record and playback related controls.

Other segments of the record/playback/pause/cam/clear/microphone controls/indicators 402A can be used during the user's recording session to perform various functions. The cam control is configured to turn the user's camera on and off. Activation of the clear control causes the previously recorded video(s) of the user to be erased, enabling the user to start over (e.g., re-record user responses to challenges). Optionally, when a user records the user responses to challenges, the recording is automatically erased when the user navigates to another challenge. This technique both ensures user privacy (as there will not be permanent recordings of the user), and reduces memory utilization for such recordings.

Activation of the send control enables the video to be stored on the user's device in a file or location of the user's choice. The user may then transmit (e.g., via email, messaging service, or otherwise) the recording to a destination entered or selected by the user. The mic segment is an indicator that is configured to indicate (via color, flashing, or otherwise) when the microphone is on.

Referring to the learning step interface 420A, the learning step interface 420A enables the user to linearly progress through one or more pre-configured combinations to aid the user in following a recommended a multi-step learning path/process. The user may use the next control 424A and the previous control 422A to navigate through the linear learning path. Activation of the next control 424A advances the user through each next step of the pre-configured learning path, loading the left video area 409A video player and the right side text area with video and text content respectively appropriate for that step. When the last step of the path is reached, activation of the next control 424A will navigate the user to a next section/display combination, which may be the next learning object or the start of the assessment process user interfaces.

The previous control 422A enables the user to return to a previous step view in the linear learning path, and reloads the content into the left video area 409A video player and the right side text area 405A with video and text content respectively appropriate for the previous step. When on the very first step of the learning path, activation of the previous control 422A may navigate the user to the previous section/display combination, which may be the previous learning object (e.g., starting with the challenge view), or back to a briefing view if the user were on the first learning object.

In addition or instead, the user may utilize the other relevant controls discussed herein to adapt a learning process the user's individual learning style.

A pre-configured path may correspond to a recommended path for new users that enables new users linearly progress through recommended display combinations, such as those discussed above with respect to Table 1 or Table 2 (e.g., challenge, observe, focus, practice, and review). Such a recommended learning path may be a combination of views (e.g., challenge, observe, focus, practice, and review) that will present information to the user in an easy to comprehend format, which aids new users unfamiliar with the many options on the training display combination controls. Progressing through each step of the path provides the user a complete view of the content presented in a logical and efficient manner.

For example, the first step of a learning path may be a challenge step which presents the user with the actual spoken challenge that the user will practice responding to. In the challenge step, the video area 409A video player may be loaded with a corresponding module challenge video, and the text area may be left blank.

At the observe step, the video area 409A video player may be loaded with a corresponding module role model video and the text area with the full script. This enables the user to view and listen to the role model video while following along in the text script.

At the focus step, the video area 409A video player may be loaded with a corresponding module role model video and the text area with the corresponding key elements (e.g., in numbered or bullet fashion) in the role model video, where the key elements should be included in a user response to a corresponding challenge, in the context of the user's own language.

At the practice step, the video area 409A video player may be loaded with a corresponding module challenge video, and the text panel may be loaded with a record/playback control. The practice step enables the user to verbally practice, aloud, in responding to the questions or statements in the challenge video. The user may optionally record the user's responses (video and/or audio recording), as similarly discussed elsewhere herein.

At the review step, the user's spoken response may be reviewed to ensure that the response includes the corresponding key elements. To assist the user in the review step, this, the video area 409A video player may be loaded with a corresponding module challenge video, and the text panel may be loaded with the key elements. Optionally, the record/playback control may be displayed, enabling the user to playback a recording of the user's challenge responses while the key elements are displayed.

As the user navigates or is navigated forwards or backwards through the learning path, the relevant content for each step will be automatically loaded to the video area 409A video player and the text area 405A. As noted above, optionally when the video loaded to the video player changes from a first video to a second video, the newly loaded video will be automatically played by the video player.

Figure 4H:
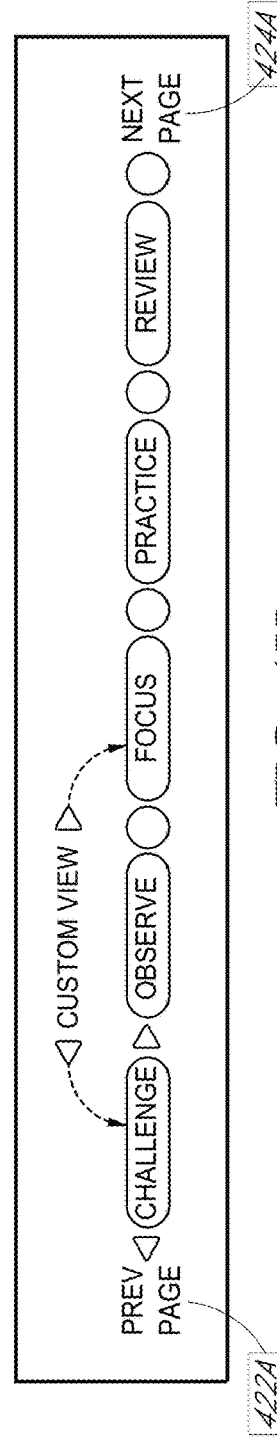

As noted elsewhere herein, the recommended learning path is simply one option that moves the user through the content in an efficient and direct manner. Once the user has become familiar with the learning path and/or the disclosed system, the user may desire to customize the user's experience. Such customization may be reflected in the learning step interface 420A as illustrated in FIG. 4H.

For example, if the user recorded herself using the record/playback control, the user might want to load the role model video in the video area 409A video player to enable the user to compare the user's performance to the challenge responses in the role model video by playing the role model video and then the user's own recorded version.

By way of further example, while the recommended learning path takes the user through a sequential multi-step process, the user may want to see other combinations of content that are not on the predefined path, and may control the content and content flow accordingly. For example, the user might want to perform a theater-style read through of a script of a challenge response, where the user plays a challenge video in the video area 409A video player to provide the user with the challenge cues, and has the script displayed on the text area 405A. The user may then do a "read through" by reading the words in the script one or more times to better learn how to respond to the challenges.

When a user diverges from a predefined multi-step process path, the learning step interface 420A may indicate that the user is performing a custom process which may reflect the user's current flow. Optionally, the learning step interface 420A may be modified to indicate recommend steps that are being by-passed via the user's current flow. For example, with reference to FIG. 4H, the learning step interface 420A has a flow arrow labeled "custom view" that indicates the custom flow, where the learning step interface 420A is rendered to indicate what step the user will be navigated to if the user activates the previous or next controls (the challenge and focus steps respectively in this example). In this example, the "custom view" is placed above the "observe" state to indicate that the navigation will correspond to the navigation that would occur if the user was on the observe state. When in a "custom view", in one example, activation of the step in the learning step interface 420A will navigate the user to the challenge step with the role model video playing in the video area 409A video player, and the text area 405A may be blank. Activation of the next display combination/step control 424A will navigate the user to the focus step, with the role model video playing in the video area 409A video player, and the text area 405A displaying key elements text. These are re-entry points into the predefined multi-step process, where the user activates the previous display combination/step control 422A control or the next display combination/step control 424A controls to return to the predefined multi-step process path.

Optionally, the user may, continue to load whatever content the user would like in the video area 409A video player and the text area 405A using the controls under each area—wandering on and off the learning path in a freestyle form as may be desirable for more experienced users.

It is understood that while the foregoing user interfaces and process described herein relate to training content for a police officer, such interfaces may be similarly used to train other users, such as bankers, sales people, call center operators, teachers, and the like. Further, the user of the user interfaces, and in particular, the dynamic navigation flow interface, are not limited to use with training content by may be utilized with other content, particularly content that includes multiple components, subcomponents, and sub-subcomponents. Further, the linear learning paths are optionally fully customizable and may be altered to suit specific industry or learning needs. For example, the learning path may be different for bankers, law enforcement, retail personnel, etc., because the people, situations, and training needs may be very different.

Thus, for example, methods and systems disclosed herein may optionally be used as part of an enhanced cloud-based network training system to efficiently and consistently embed behavior, skills and knowledge into trainees using enhanced navigation tools and processes. For example, a computer-based system is disclosed that provides deliberate verbal practice and rehearsal to provide behavioral embedding. The combination of animation, audible speech, and text further reinforces the training content. It is understood, that optionally, the animations disclosed herein may be replaced with real actors. However, advantageously, the user of animation enables more precise control of speakers in the videos. For example, during the animation creation process, user interfaces may be provided that enables an animator to select from a menu a desired faces, skin tone, ethnic group, body type, clothing, and/or background. Further, the storage of animation files may occupy this memory storage space than a live action video file.

By way of illustration, as discussed herein, the system is configurable to train users to respond to "challenges" (a statement or question by another or a scenario that for which a response is to be provided). The training system can include multiple training modules, wherein a module can include one or more challenges directed to a specific subject. Once the user has completed a practice component including the module's challenges, the user may be evaluated on how well the user responds to challenges, as described herein.

The practice component optionally includes a briefing component (e.g., where the user will be textually told/shown what the user is to learn) and role model component where a role model video is rendered demonstrating how a response to a challenge is properly done, with an accurate articulation of the relevant elements, with the appropriate delivery style (e.g., command presence). Optionally, a key elements component displays more significant elements (e.g., key elements) that the user is to learn to respond to a given challenge, where the more significant elements are embedded in phrases included contextual language. For example, the phrases may optionally include complete role model language that can be used in responding to the challenge. Further, optionally the more significant elements are visually emphasized with respect to the contextual language. It should be noted that optionally, the language of a "key element" within a given phrase does not have to be contiguous language. Each phrase is optionally separately displayed (e.g., displayed on a separate line), with a visual emphasis element (e.g., a bullet or the like) displayed at the beginning of each phrase. Further, although certain examples herein refer to command presence in the context of law enforcement training, other 'delivery styles' and delivery style scorings may be utilized for other training scenarios (e.g., for a customer assistance agent, for a call center, for a banker, for medical personnel, etc.). Thus, in the law enforcement context, the delivery style may be command presence, but in other applications the delivery style may be confidence, empathy, body language, and/or other appropriate response style and scoring of the same.

Unless the context indicates otherwise, the term "video" refers to an analog or digital video comprising actual objects and people and/or animations thereof with an audio track. For example, as discussed herein, an audio video presentation can include an animated avatar or other character that recites the role model language, challenges, instructions or other verbal content. In addition, while the avatar is reciting role model language, the key elements may optionally be textually displayed, without the surrounding contextual language. Thus, the avatar acts as an automated coach that demonstrates to the user, in a consistent and accurate manner, an example of how to respond to a challenge. The video component of a given user interface may optionally be automatically played with the user interface is played and/or may be played in response to a user activating a play control.

The methods, systems, and/or user interfaces described herein may optionally be utilized in conjunction with methods, systems, and/or user interfaces described in U.S. application Ser. No. 15/335,182, titled "SYSTEMS AND METHODS FOR COMPUTERIZED INTERACTIVE SKILL TRAINING", the content of which is incorporated herein by reference in its entirety.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers, gaming consoles, smart televisions, etc. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integer to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. For example, a click may be in the form of a user touch (via finger or stylus) on a touch screen, or in the form of a user moving a cursor (using a mouse of keyboard navigation keys) to a displayed object and activating a physical control (e.g., a mouse button or keyboard key). User inputs may, by way of example, be provided via an interface or in response to a prompt (e.g., a voice or text prompt). By way of example an interface may include text fields, wherein a user provides input by entering text into the field. By way of further example, a user input may be received via a menu selection (e.g., a drop down menu, a list or other arrangement via which the user can check via a check box or otherwise make a selection or selections, a group of individually selectable icons, a menu selection made via an interactive voice response system, etc.). When the user provides an input or activates a control, a corresponding computing system may perform a corresponding operation (e.g., store the user input, process the user input, provide a response to the user input, etc.). Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone, a VoIP equipped mobile device, etc.), laptop, tablet computer, interactive television, game console, media streaming device, head-wearable display, virtual reality display/headset, augmented reality display/headset, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

What is claimed is:
1. A system, comprising:
a processing device;
a computer readable medium that stores programmatic instructions that, when executed by the processing device, are configured to cause the system to perform operations comprising:
detect a selection of a multimedia module comprising a plurality of components including a first component and a second component, the second component comprising a plurality of subcomponents including a first subcomponent corresponding to a first content type, a second subcomponent corresponding to a second content type, and a third subcomponent corresponding to a third content type;
render, during a first mode of operation, a dynamic, graphical, navigation flow control in association with first multimedia content of the multimedia module, wherein the rendered dynamic, graphical, navigation flow control indicates the plurality of components and visually emphasizes the first component, the first component corresponding to a first current navigation position;
store a first result to memory obtained by execution of an interactive event during the first mode of operation;
based at least on the first result, enter a second mode of operation; and
re-render, during the second mode of operation, the dynamic, graphical, navigation flow control in association while the first content type and the second content types are displayed, and the third content type is not displayed;
wherein the re-rendered dynamic navigation flow control indicates the plurality of components and the plurality of subcomponents of the second component, and indicates a second current navigation position by visually emphasizing the first subcomponent of the second component corresponding to the displayed first content type, the second subcomponent of the second component corresponding to the displayed second content type, and not visually emphasizing the third subcomponent of the second component.

2. The system as defined in claim 1, wherein the dynamic, graphical, navigation flow control comprises a plurality of links to a first user interface, the first user interface comprising:
a first panel comprising a video player configured to selectively play video content, where a plurality of items of video content to be played via the first panel video player are preloaded;
a second panel configured to selectively display at least:
first static content comprising text, or
a video player configured to play real-time video of a user while the video of the user is being recorded;
wherein activation of a first link of the dynamic navigation flow control causes:
a first video, included in the plurality of items of preloaded video content, to be displayed by the video player in the first panel, and
first text to be displayed in the second panel;
wherein activation of a second link of the dynamic navigation flow control causes:
a second video to be displayed by the video player in the first panel, and
second text to be displayed in the second panel.

3. The system as defined in claim 1, wherein the dynamic, graphical, navigation flow control comprises a plurality of links to respective interfaces, wherein activation of a given link causes a respective interface to be rendered.

4. The system as defined in claim 1, wherein:
during the first mode, the first component is expanded to render one or more subcomponents of the first component, and the second component is rendered without rendering any subcomponents of the second component,
during the second mode, the second component is expanded to render the plurality of subcomponents of the second component, and the first component is rendered without rendering any subcomponents of the first component.

5. The system as defined in claim 1, the operations further comprising enabling a hierarchical navigation interface to be rendered in a sidebar visual displaced from the dynamic, graphical, navigation flow control.

6. The system as defined in claim 1, wherein the dynamic, graphical, navigation flow control rendered during the first mode of operation in association with the first multimedia content, is rendered in a user interface in association with:
a first control positioned on a bottom left-hand side of the user interface and accessible to a left user thumb when displayed on a handheld device comprising a touch display, and
a second control positioned on a bottom right-hand side of the user interface and accessible to a right user thumb when displayed on the handheld device comprising the touch display.

7. The system as defined in claim 1, wherein the multimedia module comprises briefing, practice, and evaluation media.

8. The system as defined in claim 1, wherein the multimedia module comprises animated characters whose lip, hand, limb movement are synchronized with an audio track.

9. A system, comprising:
a processing device;
a computer readable medium that stores programmatic instructions that, when executed by the processing device, are configured to cause the system to perform operations comprising:
detect a selection of a multimedia module;
render, during a first mode of operation, a dynamic navigation flow control in association with first multimedia content of the multimedia module,
wherein the rendered dynamic navigation flow control indicates a first current navigation position;
store a first result to memory obtained by execution of an interactive event during the first mode of operation;
based at least on the first result, enter a second mode of operation; and
re-render, during the second mode of operation, the dynamic navigation flow control in association with second multimedia content of the multimedia module,
wherein the re-rendered dynamic navigation flow control indicates a second navigation position corresponding to a second current navigation position,
wherein the system is configured to render a first interface comprising:
a multi-segment video recording-playback set of controls and indicators comprising:
a standby indicator,
a camera activation control,
a video content erase control,
a play control,
a microphone indicator;
wherein:
at least partly in response to activation of the record control, the record control, the camera control, and the microphone indicator are visually emphasized,
at least partly in response to activation of the playback control, the playback control, the camera control, and the microphone indicator are visually emphasized.

10. A system, comprising:
a processing device;
a computer readable medium that stores programmatic instructions that, when executed by the processing device, are configured to cause the system to perform operations comprising:
detect a selection of a multimedia module;
render, during a first mode of operation, a dynamic navigation flow control in association with first multimedia content of the multimedia module,
wherein the rendered dynamic navigation flow control indicates a first current navigation position;
store a first result to memory obtained by execution of an interactive event during the first mode of operation;
based at least on the first result, enter a second mode of operation; and
re-render, during the second mode of operation, the dynamic navigation flow control in association with second multimedia content of the multimedia module,
wherein the re-rendered dynamic navigation flow control indicates a second navigation position corresponding to a second current navigation position, and
wherein the system is configured to render a process step interface displaced from the dynamic navigation flow control, the process step interface comprising:
a recommended process flow interface, including:
a plurality of sequential process state entries,
a previous state control, which when activated, causes the user to be navigated to a previous process state in the recommended process flow interface,
a next state control, which when activated, causes the user to be navigated to a subsequent process state in the recommended process flow interface;
wherein the system is configured to detect when a user deviates from the recommended process flow interface, and in response,
generate a corresponding deviation notification, and
modify the recommended process flow interface in the process step interface to indicate a process flow state being skipped by the user.

11. Non-transitory computer readable medium that stores programmatic instructions that, when executed by a processing device, are configured to cause the processing device to perform operations comprising:
detect a selection of a multimedia module via a user input device comprising a plurality of components including a first component and a second component, the second component comprising a plurality of subcomponents including a first subcomponent corresponding to a first content type, a second subcomponent corresponding to a second content type, and a third subcomponent corresponding to a third content type;
enable, during a first mode of operation, a dynamic, graphical, navigation flow control to be rendered in association with first multimedia content of the multimedia module, wherein the rendered dynamic, graphical, navigation flow control indicates the plurality of components and visually emphasizes the first component, the first component corresponding to a first current navigation position;
enable a first result to stored memory obtained by execution of an interactive event during the first mode of operation;
enable a second mode of operation to be entered based at least in part on the first result; and
enable the dynamic, graphical, navigation flow control to be re-rendered, during the second mode of operation, while the first content type and the second content types are displayed,
wherein the re-rendered dynamic, graphical, navigation flow control indicates the plurality of components and the plurality of subcomponents of the second component, and visually emphasizes the first subcomponent of the second component corresponding to the displayed first content type, the second subcomponent of the second component corresponding to the displayed second content type, and does not visually emphasize the third subcomponent of the second component.

12. The non-transitory computer readable medium as defined in claim 11, wherein the dynamic, graphical, navigation flow control comprises a plurality of links to a first user interface, the first user interface comprising:
a first area comprising a video player configured to selectively play video content;
a second area configured to selectively display at least:
first static content comprising text, or
a video player configured to play real-time video of a user while the video of the user is being recorded;
wherein activation of a first link of the dynamic, graphical, navigation flow control causes:
a first video to be displayed by the video player in the first area, and
first text to be displayed in the second area;
wherein activation of a second link of the dynamic, graphical, navigation flow control causes:
a second video to be displayed by the video player in the first area, and
second text to be displayed in the second area.

13. The non-transitory computer readable medium as defined in claim 11, wherein the dynamic, graphical, navigation flow control comprises a plurality of links to respective interfaces, wherein activation of a given link causes a respective interface to be rendered.

14. The non-transitory computer readable medium as defined in claim 11, wherein:
during the first mode, the first component is expanded to render one or more subcomponents of the first component, and the second component is rendered without rendering any subcomponents of the second component,
during the second mode, the second component is expanded to render the plurality of subcomponents of the second component, and the first component is rendered without rendering any subcomponents of the first component.

15. The non-transitory computer readable medium as defined in claim 11, the operations further comprising enabling a hierarchical navigation interface to be rendered in a sidebar visual displaced from the dynamic, graphical, navigation flow control.

16. The non-transitory computer readable medium as defined in claim 11, wherein the dynamic, graphical, navigation flow control rendered during the first mode of operation in association with the first multimedia content, is rendered in a user interface in association with:
a first control positioned towards a bottom left-hand side of the user interface and accessible to a left user thumb when displayed on a handheld device comprising a touch display, and
a second control positioned on a bottom right-hand side of the user interface and accessible to a right user thumb when displayed on the handheld device comprising the touch display.

17. The non-transitory computer readable medium as defined in claim 11, wherein the multimedia module comprises briefing, practice, and evaluation media.

18. The non-transitory computer readable medium as defined in claim 11, wherein the multimedia module comprises animated characters whose lip, hand, limb movement are synchronized with an audio track.

19. Non-transitory computer readable medium that stores programmatic instructions that, when executed by a processing device, are configured to cause the processing device to perform operations comprising:
detect a selection of a multimedia module via a user input device;
enable, during a first mode of operation, a dynamic navigation flow control to be rendered in association with first multimedia content of the multimedia module,
wherein the rendered dynamic navigation flow control indicates a first current navigation position;
enable a first result to stored memory obtained by execution of an interactive event during the first mode of operation;
enable a second mode of operation to be entered based at least in part on the first result;
enable the dynamic navigation flow control to be re-rendered, during the second mode of operation, in association with second multimedia content of the multimedia module,
wherein the re-rendered dynamic navigation flow control indicates a second navigation position corresponding to a second current navigation position;
render a first interface comprising:
a multi-segment video recording-playback set of controls and indicators comprising:
a standby indicator,
a camera activation control,
a video content erase control,
a play control,
a microphone indicator;
wherein:
at least partly in response to activation of the record control, the record control, the camera control, and the microphone indicator are visually emphasized,
at least partly in response to activation of the playback control, the playback control, the camera control, and the microphone indicator are visually emphasized.

20. Non-transitory computer readable medium that stores programmatic instructions that, when executed by a processing device, are configured to cause the processing device to perform operations comprising:
detect a selection of a multimedia module via a user input device;

enable, during a first mode of operation, a dynamic navigation flow control to be rendered in association with first multimedia content of the multimedia module, wherein the rendered dynamic navigation flow control indicates a first current navigation position;

enable a first result to stored memory obtained by execution of an interactive event during the first mode of operation;

enable a second mode of operation to be entered based at least in part on the first result;

enable the dynamic navigation flow control to be re-rendered, during the second mode of operation, in association with second multimedia content of the multimedia module, wherein the re-rendered dynamic navigation flow control indicates a second navigation position corresponding to a second current navigation position;

render a process step interface displaced from the dynamic navigation flow control, the process step interface comprising:

a recommended process flow interface, including:

a plurality of sequential process state entries, a previous state control, which when activated, causes the user to be navigated to a previous process state in the recommended process flow interface, a next state control, which when activated, causes the user to be navigated to a subsequent process state in the recommended process flow interface;

wherein the operations are configured to detect when a user deviates from the recommended process flow interface, and in response, generate a corresponding deviation notification, and modify the recommended process flow interface in the process step interface to indicate a process flow state being skipped by the user.

21. A computer implemented method, the method comprising:

detecting, using a computerized system, a selection of a multimedia module, wherein the select is made via a user input device comprising a plurality of components including a first component and a second component, the second component comprising a plurality of subcomponents including a first subcomponent corresponding to a first content type, a second subcomponent corresponding to a second content type, and a third subcomponent corresponding to a third content type;

using the computerized system, enabling during a first mode of operation, a dynamic, graphical, navigation flow control to be rendered in association with first multimedia content of the multimedia module, wherein the rendered dynamic, graphical, navigation flow control indicates a first current navigation position the plurality of components and visually emphasizes the first component, the first component corresponding to;

using the computerized system, enabling a first result to stored memory obtained by execution of an interactive event during the first mode of operation;

using the computerized system, enabling a second mode of operation to be entered based at least in part on the first result; and using the computerized system, enabling the dynamic, graphical, navigation flow control to be re-rendered, during the second mode of operation, while the first content type and the second content types are displayed, wherein the re-rendered dynamic, graphical, navigation flow control indicates the plurality of components and the plurality of subcomponents of the second component, and visually emphasizes the first subcomponent of the second component corresponding to the displayed first content type, the second subcomponent of the second component corresponding to the displayed second content type, and does not visually emphasize the third subcomponent of the second component.

22. The computer implemented method as defined in claim 21, wherein the dynamic, graphical, navigation flow control comprises a plurality of links to a first user interface, the first user interface comprising:

a first area comprising a video player configured to selectively play video content;

a second area configured to selectively display at least:

first static content comprising text, or a video player configured to play real-time video of a user while the video of the user is being recorded;

wherein activation of a first link of the dynamic, graphical, navigation flow control causes:

a first video to be displayed by the video player in the first area, and first text to be displayed in the second area;

wherein activation of a second link of the dynamic, graphical, navigation flow control causes:

a second video to be displayed by the video player in the first area, and second text to be displayed in the second area.

23. The computer implemented method as defined in claim 21, wherein the dynamic, graphical, navigation flow control comprises a plurality of links to respective interfaces, wherein activation of a given link causes a respective interface to be rendered.

24. The computer implemented method as defined in claim 21, wherein:

during the first mode, the first component is expanded to render one or more subcomponents of the first component, and the second component is rendered without rendering any subcomponents of the second component, during the second mode, the second component is expanded to render the plurality of subcomponents of the second component, and the first component is rendered without rendering any subcomponents of the first component.

25. The computer implemented method as defined in claim 21, the method further comprising enabling a hierarchical direct navigation interface to be rendered, the direction navigation interface visually displaced from the dynamic, graphical, navigation flow control.

26. The non-transitory computer readable medium as defined in claim 11, wherein the dynamic, graphical, navigation flow control rendered during the first mode of operation in association with the first multimedia content, is rendered in a user interface in association with:

a first control positioned towards a bottom left-hand side of the user interface and accessible to a left user thumb when displayed on a handheld device comprising a touch display, and a second control positioned on a bottom right-hand side of the user interface and accessible to a right user thumb when displayed on the handheld device comprising the touch display.

27. The computer implemented method as defined in claim 21 wherein the multimedia module comprises briefing, practice, and evaluation media.

28. The computer implemented method as defined in claim 21, wherein the multimedia module comprises animated characters whose lip, hand, limb movement are synchronized with an audio track.

29. A computer implemented method, the method comprising:
   detecting, using a computerized system, a selection of a multimedia module, wherein the select is made via a user input device;
   using the computerized system, enabling during a first mode of operation, a dynamic navigation flow control to be rendered in association with first multimedia content of the multimedia module,
   wherein the rendered dynamic navigation flow control indicates a first current navigation position;
   using the computerized system, enabling a first result to stored memory obtained by execution of an interactive event during the first mode of operation;
   using the computerized system, enabling a second mode of operation to be entered based at least in part on the first result;
   using the computerized system, enabling the dynamic navigation flow control to be re-rendered, during the second mode of operation, in association with second multimedia content of the multimedia module,
   wherein the re-rendered dynamic navigation flow control indicates a second navigation position corresponding to a second current navigation position;
   rendering a first interface comprising:
   a multi-segment video recording-playback set of controls and indicators comprising:
      a standby indicator,
      a camera activation control,
      a video content erase control,
      a play control,
      a microphone indicator;
   wherein:
   at least partly in response to activation of the record control, the record control, the camera control, and the microphone indicator are visually emphasized,
   at least partly in response to activation of the playback control, the playback control, the camera control, and the microphone indicator are visually emphasized.

30. A computer implemented method, the method comprising:
   detecting, using a computerized system, a selection of a multimedia module, wherein the select is made via a user input device;
   using the computerized system, enabling during a first mode of operation, a dynamic navigation flow control to be rendered in association with first multimedia content of the multimedia module,
   wherein the rendered dynamic navigation flow control indicates a first current navigation position;
   using the computerized system, enabling a first result to stored memory obtained by execution of an interactive event during the first mode of operation;
   using the computerized system, enabling a second mode of operation to be entered based at least in part on the first result;
   using the computerized system, enabling the dynamic navigation flow control to be re-rendered, during the second mode of operation, in association with second multimedia content of the multimedia module,
   wherein the re-rendered dynamic navigation flow control indicates a second navigation position corresponding to a second current navigation position;
   rendering a process step interface separate from the dynamic navigation flow control, the process step interface comprising:
   a recommended process flow interface, including:
      a plurality of sequential process state entries,
      a previous state control, which when activated, causes the user to be navigated to a previous process state in the recommended process flow interface,
      a next state control, which when activated, causes the user to be navigated to a subsequent process state in the recommended process flow interface;
   detecting when a user deviates from the recommended process flow interface, and in response,
      generating a corresponding deviation notification, and
      modifying the recommended process flow interface in the process step interface to indicate a process flow state being skipped by the user.

\* \* \* \* \*